US010778083B2

(12) United States Patent
Escudero Rodriguez et al.

(10) Patent No.: US 10,778,083 B2
(45) Date of Patent: Sep. 15, 2020

(54) POWER CONVERTER WITH LOW DRAIN VOLTAGE OVERSHOOT IN DISCONTINUOUS CONDUCTION MODE

(71) Applicant: Infineon Technologies Austria AG, Villach (AT)

(72) Inventors: Manuel Escudero Rodriguez, Villach (AT); Matteo-Alessandro Kutschak, Ludmannsdorf (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/046,182

(22) Filed: Jul. 26, 2018

(65) Prior Publication Data

US 2020/0036282 A1 Jan. 30, 2020

(51) Int. Cl.
*H02M 3/335* (2006.01)
*H02M 1/32* (2007.01)

(52) U.S. Cl.
CPC ......... *H02M 1/32* (2013.01); *H02M 3/33592* (2013.01)

(58) Field of Classification Search
CPC ............ H02M 3/22; H02M 3/24; H02M 3/28; H02M 3/325; H02M 3/335; H02M 3/33507; H02M 3/33515; H02M 3/33523; H02M 3/3353; H02M 3/33538; H02M 3/33546; H02M 3/33553; H02M 3/33569; H02M 3/33576; H02M 3/33584; H02M 3/33592; H02M 3/337; H02M 1/14; H02M 1/143;

(Continued)

(56) References Cited

U.S. PATENT DOCUMENTS 6,452,815 B1 9/2002 Zhu et al.
7,196,914 B2 * 3/2007 Ren .................. H02M 3/33569 363/21.14

(Continued)

FOREIGN PATENT DOCUMENTS

JP 2014007942 A 1/2014

OTHER PUBLICATIONS

"Bidirectional DC-DC Converter", Texas Instruments, TI Designs, TIDUAI7, Sep. 2015.
"PSFB Control Using C2000 Microcontrollers", Texas Instruments, Application Report, SPRABR1, May 2013.

*Primary Examiner* — Thienvu V Tran
*Assistant Examiner* — Carlos O Rivera-Perez
(74) *Attorney, Agent, or Firm* — Murphy, Bilak & Homiller, PLLC

(57) ABSTRACT

A power converter includes a primary side with switch devices that form a power transfer stage, and a secondary side with switch devices that form a rectification stage and an output filter coupled to the rectification stage and including an output inductor and output capacitor. A transformer couples the primary and secondary sides. The switch devices are controlled in DCM (discontinuous conduction mode) to transfer energy from the primary side to the secondary side during a power transfer interval in which one branch of the power transfer stage is conducting, one branch of the rectification stage is conducting and another branch of the rectification stage is blocking. As a voltage of the transformer first begins to rise at the start of a new power transfer interval in DCM, the branch of the rectification stage that is to be conducting during the new power transfer interval is hard switched on.

20 Claims, 23 Drawing Sheets

PRIMARY SIDE

SECONDARY SIDE

Controller 106

(58) Field of Classification Search

CPC ............ H02M 1/15; H02M 1/32; H02M 1/34; H02M 1/36; H02M 2001/0048; H02M 2001/0054; H02M 2001/0058; H02M 2001/322; H02M 2001/344; H02M 2001/0032; H02M 2001/0035; H02M 7/5387; H02M 7/53871; H02M 2007/4815; H02M 1/083; H02M 2001/342–348; Y02B 70/1416; Y02B 70/1433; Y02B 70/1475; Y02B 70/1458

USPC .... 363/15–26, 36, 40–48, 50–56.12, 74, 79, 363/84, 95–98, 123–127, 131–134; 323/205–211, 235, 238, 271–276, 323/282–287, 351, 908

See application file for complete search history.

(56) References Cited

U.S. PATENT DOCUMENTS

2007/0025125 A1 2/2007 Nakahori et al.
2009/0059622 A1 3/2009 Shimada et al.
2009/0086512 A1* 4/2009 Fahlenkamp ..... H02M 3/33592 363/21.06
2009/0244934 A1* 10/2009 Wang ................ H02M 3/33592 363/21.06
2011/0032731 A1 2/2011 Coleman et al.
2012/0063175 A1* 3/2012 Wang ................ H02M 3/33592 363/21.14
2014/0334189 A1 11/2014 Yan et al.
2015/0036390 A1* 2/2015 Ou .................... H02M 3/33592 363/17

* cited by examiner

POWER CONVERTER WITH LOW DRAIN VOLTAGE OVERSHOOT IN DISCONTINUOUS CONDUCTION MODE

BACKGROUND

In power converters having a phase-shift full bridge topology, the output filter inductor resonates with the output capacitance of the synchronous rectifiers on the secondary side when the current in the output filter inductor becomes discontinuous. The current in the output filter inductor becomes discontinuous when the current ripple exceeds the average output current. This condition is referred to as discontinuous conduction mode (DCM). Power converters typically enter DCM at light or very light loads.

The resonance between the output filter inductor and the output capacitance of the secondary-side synchronous rectifiers in DCM causes pre-charging of the output capacitance of the synchronous rectifiers to a certain voltage prior to the primary side of the converter starting a new power transfer interval. This stored charge in the output capacitance of the secondary-side synchronous rectifiers adds to the transformer reflected voltage on the secondary side, inducing a drain voltage overshoot at the secondary-side rectifiers. A higher voltage class of synchronous rectifier may handle the overshoot, but with worse figure of merit and therefore decreased overall system performance. Standard snubber techniques for mitigating the overshoot are lossy and over-dimensioned for any other working conditions of the power converter.

Hence, there is a need for an improved technique for mitigating the drain voltage overshoot that occurs on the secondary side of a phase-shift full bridge converter during DCM.

SUMMARY

According to an embodiment of a power converter, the power converter comprises: a primary side comprising switch devices that form a power transfer stage; a secondary side comprising switch devices that form a rectification stage and an output filter coupled to the rectification stage, the output filter comprising an output inductor and an output capacitor; a transformer coupling the primary side and the secondary side; and a controller operable to control the switch devices in DCM (discontinuous conduction mode), to transfer energy from the primary side to the secondary side during a power transfer interval in which one branch of the power transfer stage is conducting, one branch of the rectification stage is conducting and another branch of the rectification stage is blocking, wherein as a voltage of the transformer first begins to rise at the start of a new power transfer interval in DCM, the controller is operable to hard switch on the branch of the rectification stage that is to be conducting during the new power transfer interval, so that the branch of the rectification stage that is hard switched on begins dissipating charge stored in capacitances of the branches of the rectification stage when the transformer voltage first begins to rise.

The controller may be operable to hard switch on the branch of the rectification stage that is to be conducting during the new power transfer interval at a predetermined time which is based on: leakage of the transformer; stray inductance and external resonant inductance; and capacitances of the branches of the rectification stage on the secondary side.

Separately or in combination, the controller may be operable to hard switch on the branch of the rectification stage that is to be conducting during the new power transfer interval at a predetermined time which is selected to minimize voltage overshot experienced by the branch of the rectification stage that is blocking during the new power transfer interval, the voltage overshoot caused by charge stored in capacitances of the branches of the rectification stage between power transfer intervals due to resonance that occurs on the secondary side during DCM.

Separately or in combination, the controller may be operable to hard switch on the branch of the rectification stage that is to be conducting during the new power transfer interval after a delay from when the controller activates the branch of the power transfer stage that is to be conducting during the new power transfer interval, and the delay may be given by:

$$\text{delay} = \frac{2 * \pi * \sqrt{(L_r + L_{lkg}) * \left(\frac{Coss_{SRx}}{2}\right)}}{2},$$

where $L_{lkg}$ is leakage of the transformer, $L_r$ are stray inductance and external resonant inductance, and $Coss_{SRx}$ is capacitance of the branches of the rectification stage which store charge between power transfer intervals due to resonance that occurs on the secondary side during DCM.

Separately or in combination, after hard switching on the branch of the rectification stage that is to be conducting during the new power transfer interval, the controller may be operable to maintain activation of the branch of the rectification stage that is hard switched on so long as both switch devices of the branch of the power transfer stage that is conducting during the new power transfer interval remain on.

Separately or in combination, after hard switching on the branch of the rectification stage that is to be conducting during the new power transfer interval, the controller may be operable to maintain activation of the branch of the rectification stage that is hard switched on until current of the output filter inductor returns to zero or near zero.

Separately or in combination, the controller may be operable to start a timer at an end of a dead time for the switch devices of the branch of the power transfer stage that is to be conducting during the new power transfer interval, and the controller may be operable to hard switch on the branch of the rectification stage that is to be conducting during the new power transfer interval when the timer expires.

Separately or in combination, after hard switching on the branch of the rectification stage that is to be conducting during the new power transfer interval, the controller may be operable to maintain activation of the branch of the rectification stage that is hard switched on so long as both switch devices of the branch of the power transfer stage that is conducting during the new power transfer interval remain on.

Separately or in combination, the controller may be operable to control the switch devices in a burst mode under lower power demand than in DCM, to transfer energy from the primary side to the secondary side during a power transfer interval in which one branch of the power transfer stage is conducting, one branch of the rectification stage is conducting and another branch of the rectification stage is blocking, and as the transformer voltage first begins to rise at the start of a new power transfer interval in the burst mode, the controller may be operable to hard switch on the branch of the rectification stage that is to be conducting during the new power transfer interval, so that the branch of the rectification stage that is hard switched on begins dissipating charge stored in capacitances of the branches of the rectification stage when the transformer voltage first begins to rise.

Separately or in combination, the power converter may have a phase-shift full bridge converter topology.

Separately or in combination, the power converter may have a current doubler topology.

According to an embodiment of a method of operating a power converter having a primary side with switch devices that form a power transfer stage, a secondary side with switch devices that form a rectification stage and an output filter coupled to the rectification stage, the output filter comprising an output inductor and an output capacitor, and a transformer coupling the primary side and the secondary side, the method comprises: controlling the switch devices in DCM (discontinuous conduction mode), to transfer energy from the primary side to the secondary side during a power transfer interval in which one branch of the power transfer stage is conducting, one branch of the rectification stage is conducting and another branch of the rectification stage is blocking; and as a voltage of the transformer first begins to rise at the start of a new power transfer interval in DCM, hard switching on the branch of the rectification stage that is to be conducting during the new power transfer interval, so that the branch of the rectification stage that is hard switched on begins dissipating charge stored in capacitances of the branches of the rectification stage when the transformer voltage first begins to rise.

Hard switching on the branch of the rectification stage that is to be conducting during the new power transfer interval may comprise hard switching on the branch of the rectification stage that is to be conducting during the new power transfer interval at a predetermined time which is based on: leakage of the transformer; stray inductance and external resonant inductance; and capacitances of the branches of the rectification stage on the secondary side.

Separately or in combination, hard switching on the branch of the rectification stage that is to be conducting during the new power transfer interval may comprise hard switching on the branch of the rectification stage that is to be conducting during the new power transfer interval at a predetermined time which is selected to minimize voltage overshot experienced by the branch of the rectification stage that is blocking during the new power transfer interval, the voltage overshoot caused by charge stored in capacitances of the branches of the rectification stage between power transfer intervals due to resonance that occurs on the secondary side during DCM.

Separately or in combination, hard switching on the branch of the rectification stage that is to be conducting during the new power transfer interval may comprise hard switching on the branch of the rectification stage that is to be conducting during the new power transfer interval after a delay from when the controller activates the branch of the power transfer stage that is to be conducting during the new power transfer interval, and the delay may be given by:

$$\text{delay} = \frac{2 * \pi * \sqrt{(L_r + L_{lkg}) * \left(\frac{Coss_{SRx}}{2}\right)}}{2},$$

where $L_{lkg}$ is leakage of the transformer, $L_r$ are stray inductance and external resonant inductance, and $Coss_{SRx}$ is capacitance of the branches of the rectification stage which store charge between power transfer intervals due to resonance that occurs on the secondary side during DCM.

Separately or in combination, the method may further comprise, after hard switching on the branch of the rectification stage that is to be conducting during the new power transfer interval, maintaining activation of the branch of the rectification stage that is hard switched on so long as both switch devices of the branch of the power transfer stage that is conducting during the new power transfer interval remain on.

Separately or in combination, the method may further comprise, after hard switching on the branch of the rectification stage that is to be conducting during the new power transfer interval, maintaining activation of the branch of the rectification stage that is hard switched on until current of the output filter inductor returns to zero or near zero.

Separately or in combination, hard switching on the branch of the rectification stage that is to be conducting during the new power transfer interval may comprise: starting a timer at an end of a dead time for the switch devices of the branch of the power transfer stage that is to be conducting during the new power transfer interval; and hard switching on the branch of the rectification stage that is to be conducting during the new power transfer interval when the timer expires.

Separately or in combination, the method may further comprise, after hard switching on the branch of the rectification stage that is to be conducting during the new power transfer interval, maintaining activation of the branch of the rectification stage that is hard switched on so long as both switch devices of the branch of the power transfer stage that is conducting during the new power transfer interval remain on.

Separately or in combination, the method may further comprise: controlling the switch devices in a burst mode under lower power demand than in DCM, to transfer energy from the primary side to the secondary side during a power transfer interval in which one branch of the power transfer stage is conducting, one branch of the rectification stage is conducting and another branch of the rectification stage is blocking; and as the transformer voltage first begins to rise at the start of a new power transfer interval in the burst mode, hard switching on the branch of the rectification stage that is to be conducting during the new power transfer interval, so that the branch of the rectification stage that is hard switched on begins dissipating charge stored in capacitances of the branches of the rectification stage when the transformer voltage first begins to rise.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein mitigate drain voltage overshoot that occurs on the secondary side of a power converter during DCM. As a voltage of the transformer first begins to rise at the start of a new power transfer interval in DCM, the secondary-side branch that is to be conducting during the new power transfer interval is hard switched on so that the branch begins dissipating charge stored in capacitance of the branches on the secondary side of the converter when the transformer voltage first begins to rise.

Figure 1:
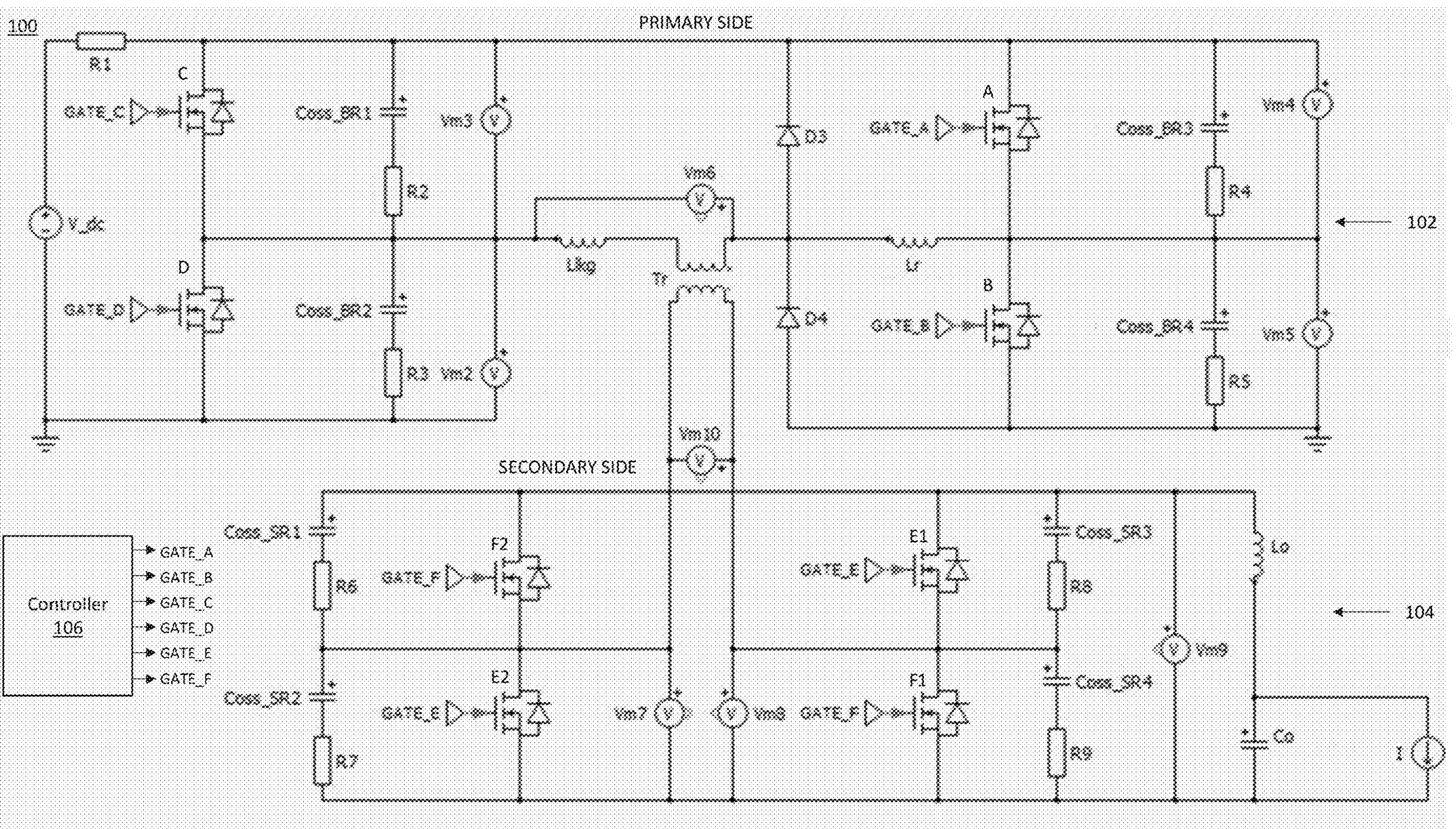
FIG. 1 illustrates a schematic diagram of an embodiment of a phase-shift full bridge power converter which mitigates drain voltage overshoot on the secondary side during DCM operation.

FIG. 1 illustrates an embodiment of a phase-shift full bridge power converter 100. The phase-shift full bridge power converter 100 includes a primary side having a plurality of switch devices A, B, C, D that form a power transfer stage 102, and a secondary side having a plurality of switch devices E1, E2, F1, F2 that form a rectification stage 104. The secondary side also includes an output filter coupled to the rectification stage, the output filter including an output inductor Lo and an output capacitor Co. Various voltages at different nodes in the power converter 100 are illustrated as voltage sources (Vmx), various resistances are illustrated as resistors (Rx), and various capacitances are illustrated as capacitors (Coss_x).

On the primary side of the phase-shift full bridge power converter 100, high-side switch device A is connected in series with low-side switch device D to form a first branch of the primary-side power transfer stage 102, and high-side switch device C is connected in series with low-side switch device B to form a second branch of the primary-side power transfer stage 102. Similarly on the secondary side, high-side switch device E1 is connected in series with low-side switch device E2 to form a first branch of the secondary-side rectification stage 104, and high-side switch device F2 is connected in series with low-side switch device F1 to form a second branch of the secondary-side rectification stage 104.

Those skilled in the art will readily understand that a different type of rectification stage may be used on the secondary side such as, but not limited to, a current-fed push-pull, center-taped or current doubler rectification stage as will be described in more detail later herein. In general, any type of synchronous rectification stage may be used on the secondary side without departing from the intended scope of the drain voltage overshoot mitigation embodiments described herein. The primary-side switch devices A through D and the secondary-side switch devices E1 through F2 of the phase-shift full bridge power converter 100 are illustrated as power MOSFETs each having a corresponding freewheeling diode. However, any suitable power transistor can be used for the primary-side switch devices A through D and the secondary-side switch devices E1 through F2 of the power converter 100, such as but not limited to power MOSFETs, IGBTs (insulated gate bipolar transistors), HEMTs (high-electron mobility transistors), etc.

The phase-shift full bridge power converter 100 also includes a transformer Tr which couples the primary side and the secondary side, and a controller 106 for controlling the primary-side switch devices A through D and the secondary-side switch devices E1 through F2 in CCM (continuous conduction mode) and DCM (discontinuous conduction mode). In CCM, the current in the output filter inductor Lo does not become discontinuous and therefore no related drain voltage overshoot is induced at the secondary-side switch devices E1 through F2. In DCM, the output filter inductor Lo resonates with the capacitance (Coss_SR1, Coss_SR2, Coss_SR3, Coss_SR4) of the secondary-side switch devices E1 through F2, causing drain voltage overshoot on the secondary side of the power converter 100. The embodiments described herein mitigate the drain voltage overshoot that occurs on the secondary side during DCM. Hence, no further description of CCM operation is provided. Moreover, CCM operation at higher load conditions is well known in the art and thus no further explanation is warranted. The load powered by the phase-shift full bridge power converter 100 is generically illustrated as a current source (I) in FIG. 1.

The power converter controller 106 controls the primary-side switch devices A through D and the secondary-side switch devices E1 through F2 in DCM to transfer energy from the primary side to the secondary side during a power transfer interval in which one branch of the power transfer stage 102 is conducting, one branch of the rectification stage 104 is conducting and another branch of the rectification stage 104 is blocking. As voltage Vm10, which is the voltage over the winding of the transformer Tr on the secondary side, first begins to rise at the start of a new power transfer interval in DCM, the controller 106 hard switches on the branch of the rectification stage 104 that is to be conducting during the new power transfer interval. This way, the hard switched on branch of the rectification stage 104 begins dissipating charge stored in the capacitance (Coss_SR1, Coss_SR2, Coss_SR3, Coss_SR4) of the branches of the rectification stage 104 when the transformer voltage Vm10 first begins to rise. Under conventional DCM control, that branch would instead remain switched off until later in the power transfer interval and therefore be subject to the overshoot caused by resonance on the secondary side of the power converter 100.

FIGS. 2A through 2F illustrate operation of the phase-shift full bridge power converter 100 during different stages of one complete power transfer interval, and the corresponding control signals generated by the controller 106. The primary-side power stage branch formed by switch devices A and D transfers power to the secondary side during the illustrated power transfer interval, and the secondary-side rectification stage branch formed by switch devices E1 and E2 provides synchronous rectification during the illustrated power transfer interval. The complimentary primary and secondary side branches (C+B and F2+F1) of the power converter 100 provide the power transfer and rectification functions, respectively, during the immediately following power transfer interval.

The controller 106 generates PWM (pulse width modulation) or similar signals GATE_A through GATE_F for controlling switching of the respective primary-side switch devices A through D and secondary-side switch devices E1 through F2 of the power converter 100, to transfer energy from the primary side to the secondary side over the course of a complete power transfer interval. FIGS. 2A through 2F also illustrate the output inductor current (Lo_current), the resonant voltage (SR_F1_Vds) across low-side switch device F1 on the secondary side, the resonant voltage (SR_E2_Vds) across low-side switch device E2 on the secondary side, and the full voltage (Coss_SRx_V) resonating across the output of the rectification stage 104 on the secondary side. Depending on which primary and secondary side branch pairs are involved in transferring power, the voltage Coss_SRx_V corresponds to the voltage on either the switch device output capacitance Coss_SR1+Coss_SR2 or the switch device output capacitance Coss_SR3+Coss_SR4 on the secondary side. The capacitance term Coss_SRx used herein refers to either the output capacitance Coss_SR1+Coss_SR2 of secondary-side switch devices F2 and E2 or the output capacitance Coss_SR3+Coss_SR4 of secondary-side switch devices E1 and F1, and depends on which secondary-side branch is conducting and which secondary-side branch is blocking during a power transfer interval. The voltage (SR_F1_Vds or SR_E2_Vds) applied to the drain of the corresponding low-side switch device E2 or F1 on the secondary side is half of Coss_SRx_V. In FIGS. 2A through 2F, the solid lines represent current flow on both sides of the converter 100.

Figure 2A:
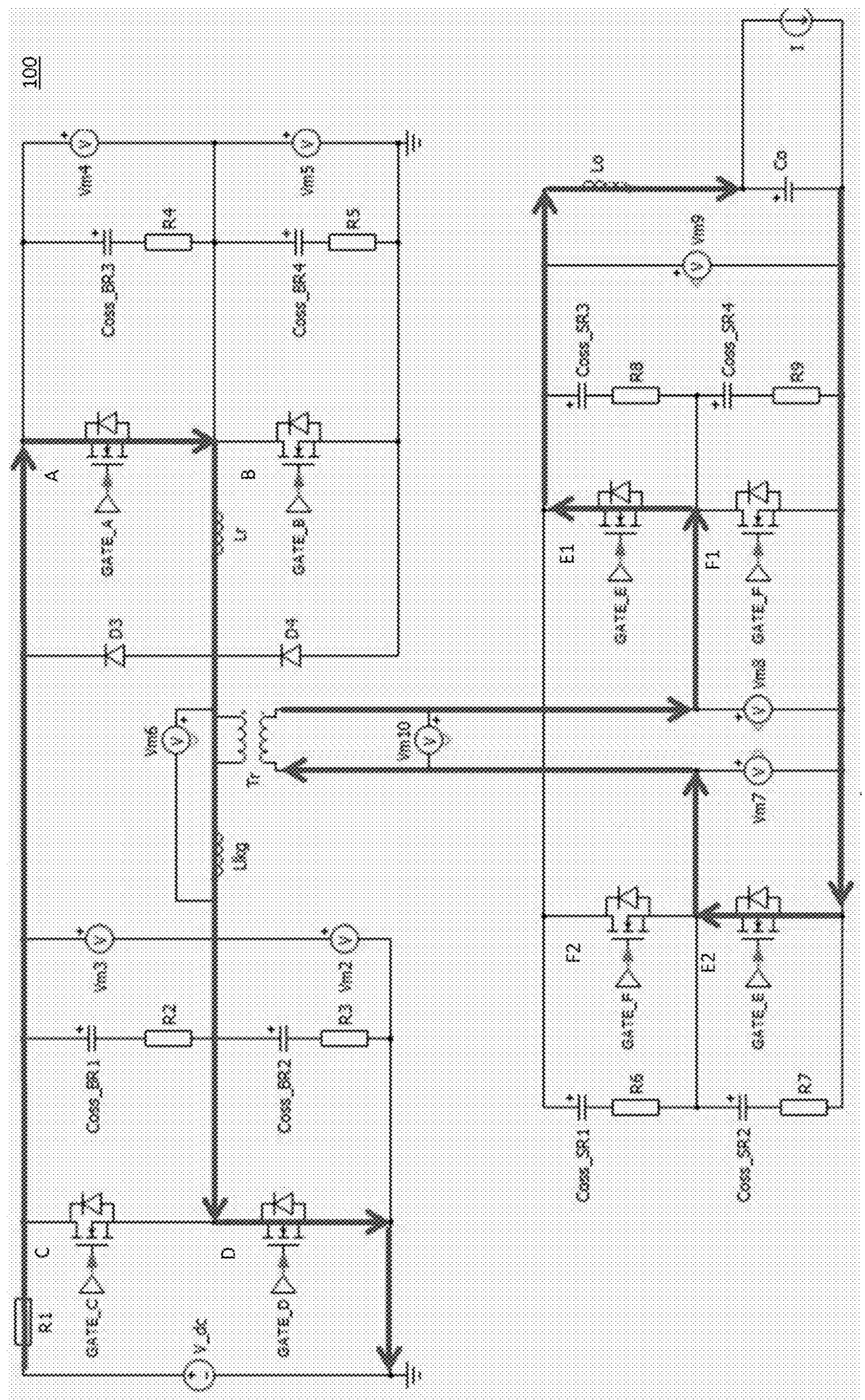
FIGS. 2A through 2F illustrate operation of the phase-shift full bridge power converter during different stages of one complete power transfer interval, and the corresponding control signals for the switch devices on the primary and secondary sides.
Figure 2A:
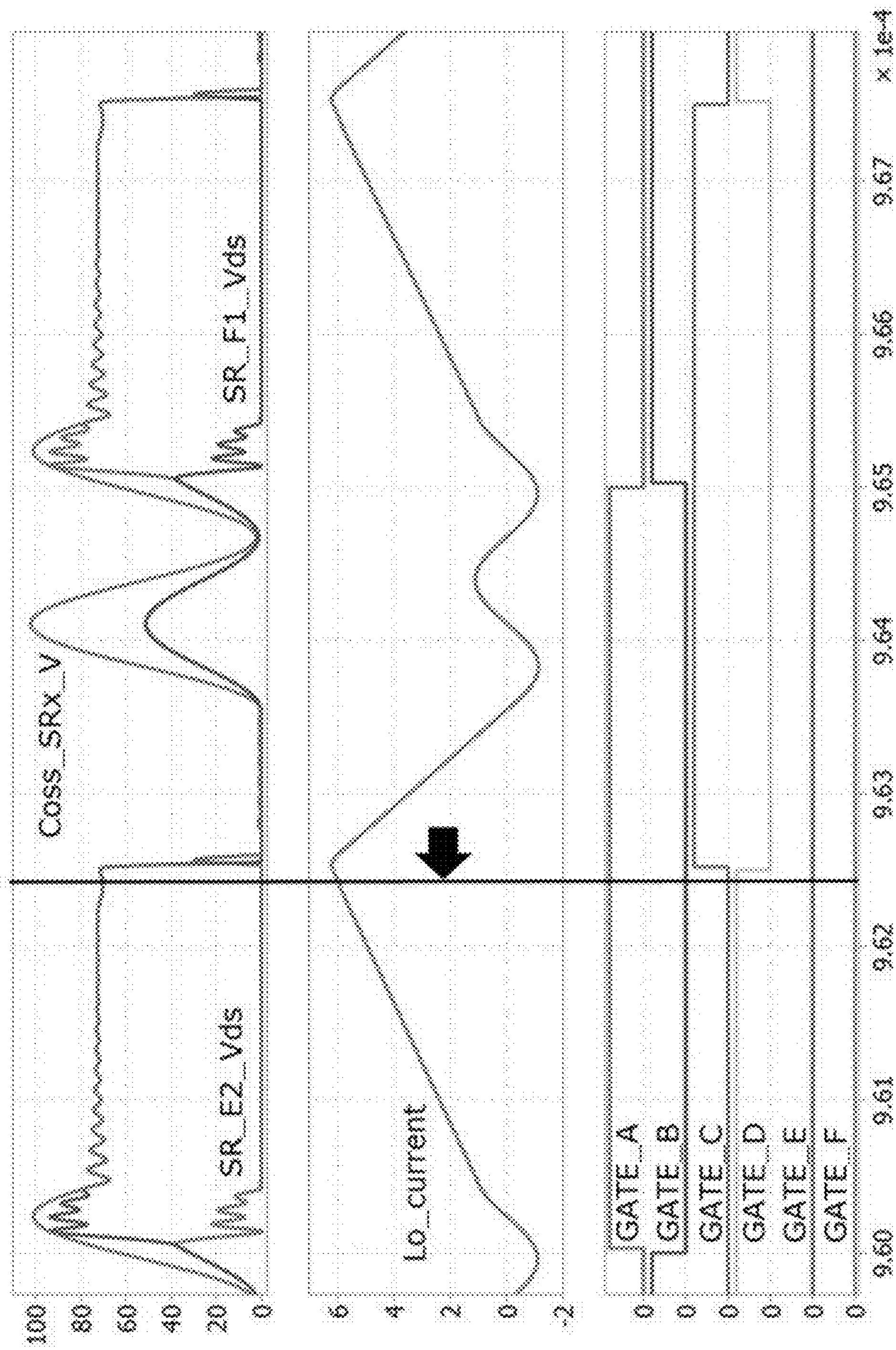

FIG. 2A shows the phase-shift full bridge power converter 100 during a power transfer from the primary side to the secondary side of the converter 100. The secondary-side winding of the transformer Tr reflects voltage from the primary-side winding, and hence the output filter may be considered connected to the input supply (V_dc). The secondary-side rectification branch (E1+E2) controlled by signal GATE_E conducts while the other secondary-side rectification branch (F1+F2) blocks the reflected voltage of the transformer Tr. Current in the output filter inductor Lo increases, as does the energy stored in the inductor Lo. In a full bridge rectifier configuration, the blocking voltage for the switch devices E1 through F2 on the secondary side is the input voltage V_dc multiplied by the turns ratio of the transformer Tr.

Figure 2B:
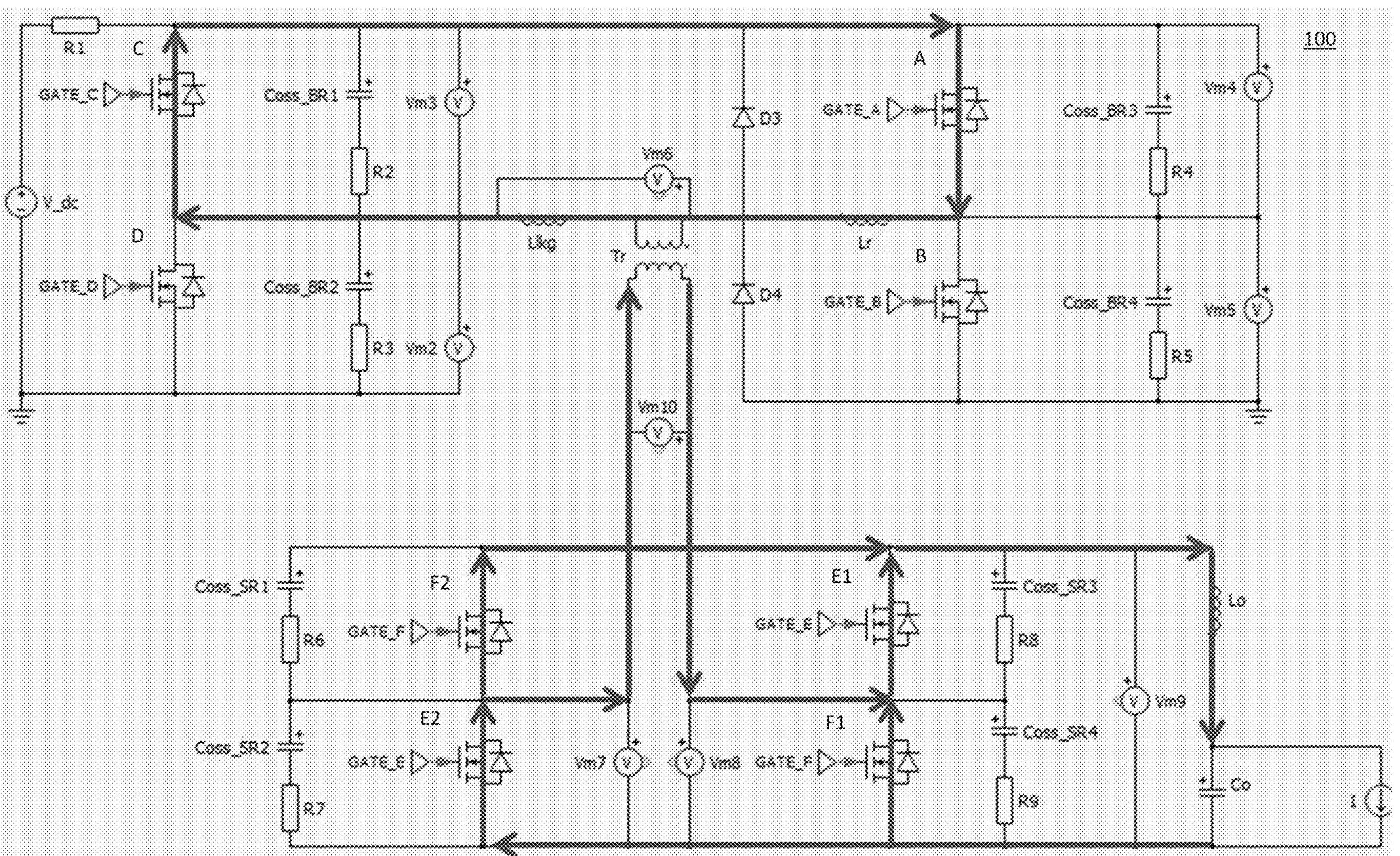
Figure 2B:
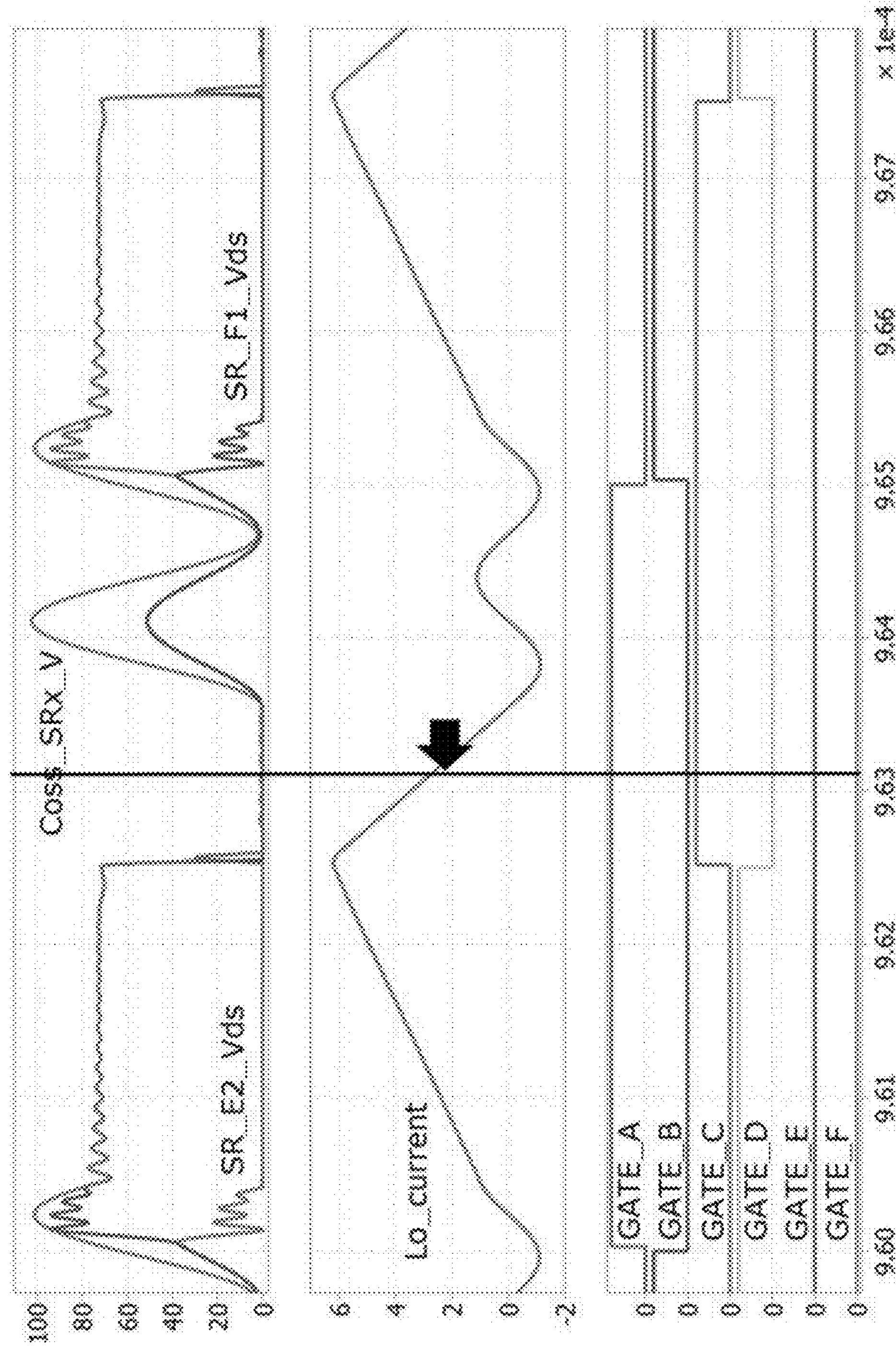

FIG. 2B shows the phase-shift full bridge power converter 100 when the primary side of the transformer Tr is shorted and therefore does not influence the secondary side of the power converter 100. The primary side is freewheeling in this stage. The secondary side of the transformer Tr also is shorted in this stage. The secondary-side switch device output capacitance Coss_SRx discharges, thereby distributing current between both branches (E1+E2 and F1+F2) of the rectification stage 104. The current may not be distributed equally, and all secondary switch devices E1 through F2 conduct. Energy of the output inductor Lo decreases as the voltage now opposes the flow of current. The voltage Coss_SRx_V on the secondary-side switch device output capacitance Coss_SRx is just the diode voltage drop (or channel drop if the channel of a secondary-side switch device is active) at the illustrated point.

Figure 2C:
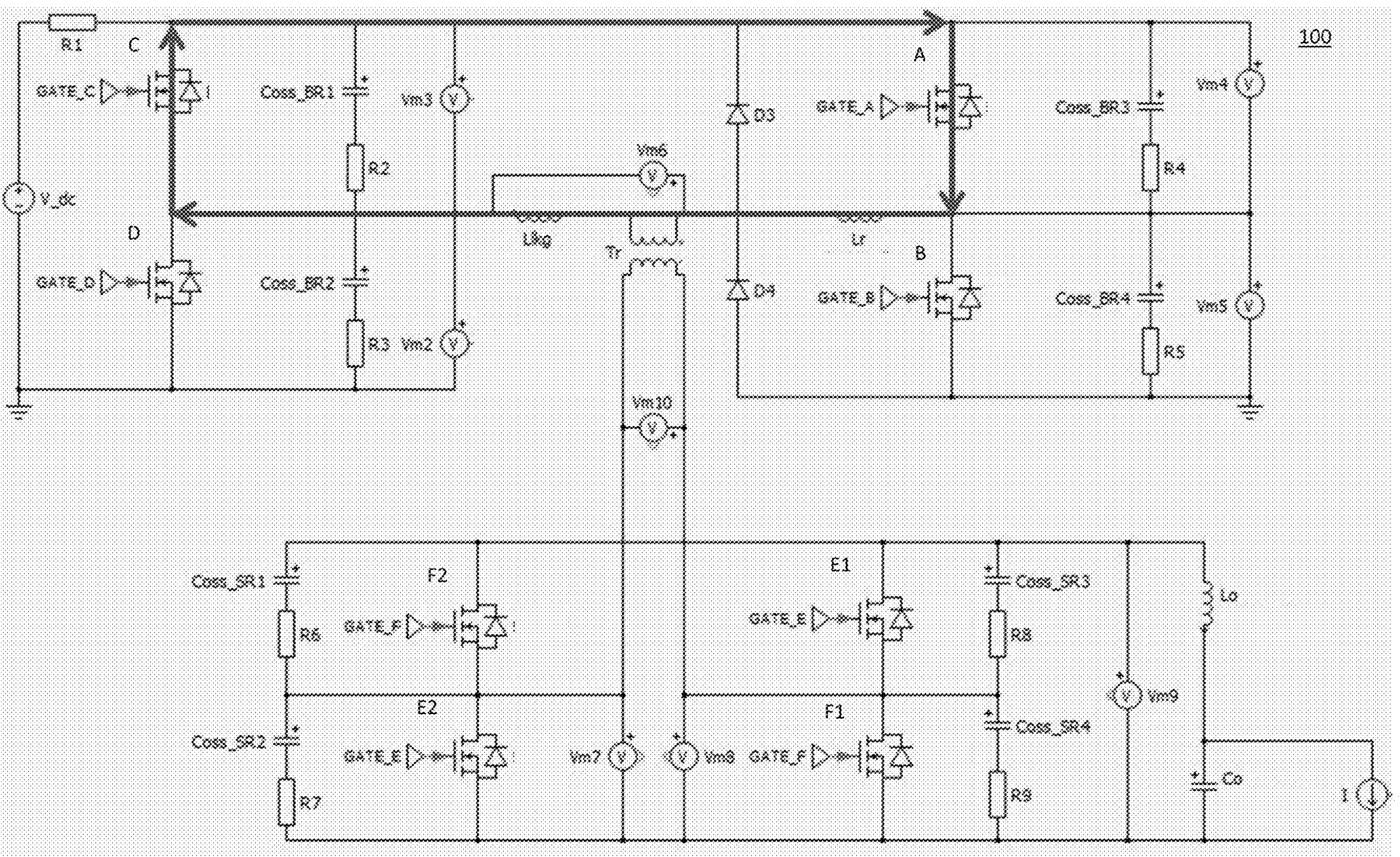
Figure 2C:
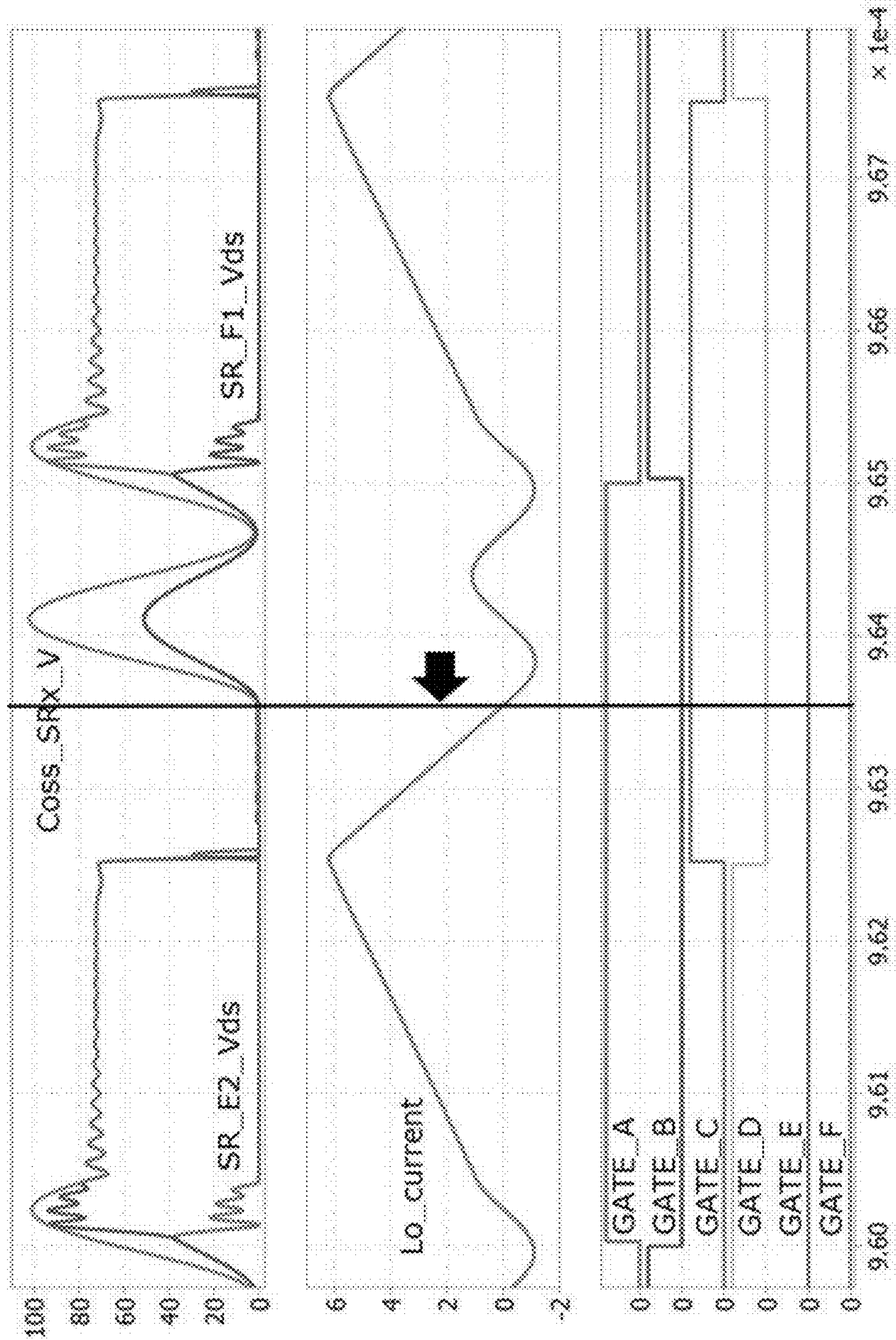

FIG. 2C shows the phase-shift full bridge power converter 100 when the output inductor Lo current (Lo_current) crosses zero during the freewheeling stage. Right at this point, the energy of the output inductor Lo is zero and so is the energy of the secondary-side switch device output capacitance Coss_SRx. However, the output inductor Lo has voltage applied as the output capacitance Co of the power converter 100 is charged. The output inductor voltage forces current to increase in the reverse direction and to charge the secondary-side switch device output capacitance Coss_SRx.

Figure 2D:
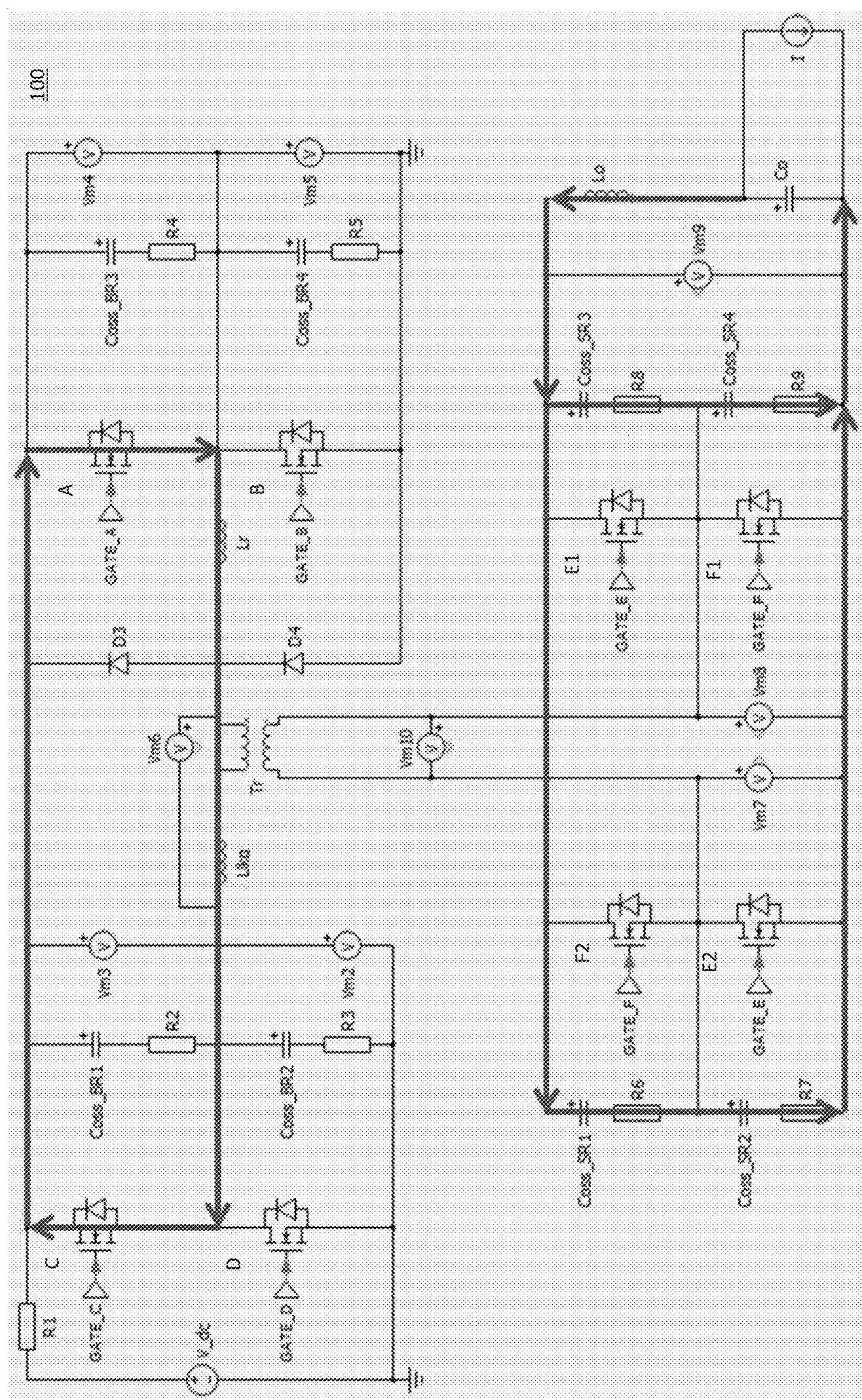
Figure 2D:
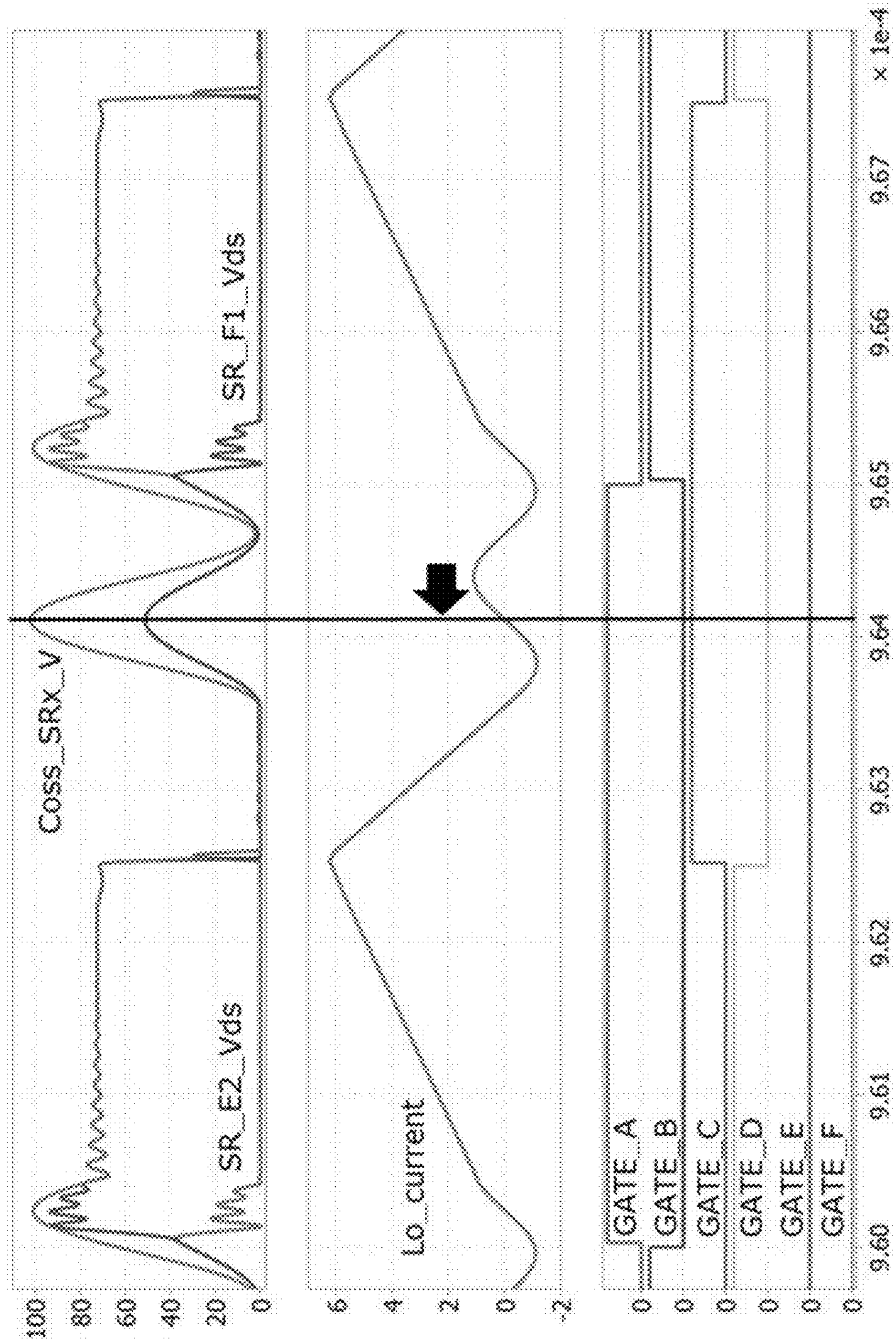

FIG. 2D shows the phase-shift full bridge power converter 100 when the output inductor current Lo_current is about to cross zero after almost completing half resonance with the secondary-side switch device output capacitance Coss_SRx. Current in the output inductor Lo reverses by the effect of the voltage difference between Co and Coss_SRx. The current reversal continues until the voltage Coss_SRx_V on the secondary-side switch device output capacitance Coss_SRx is higher than the output capacitance Co, and the energy of the output inductor Lo is emptied so the resonance reverses direction again. At this point, the secondary-side switch device output capacitance Coss_SRx is at the maximum energy point of resonance. If left unmitigated, the resonance will continue until a new power transfer interval begins. If at this point some energy is still stored in the secondary-side switch device output capacitance Coss_SRx, the energy will sum up to the voltage applied by the transformer Tr and blocked by the corresponding branch (E1+E2 or F1+F2) of the rectification stage 104 on the secondary side. In this case, undesired drain voltage overshoot appears. In the example illustrated in FIGS. 2A through 2F, the secondary-side rectification branch formed by switch devices E1 and E2 is switched on at the beginning of the illustrated power transfer and therefore the drain-to-source voltage for this branch goes to zero. The secondary-side rectification branch formed by switch devices F1 and F2 sees any overshoot voltage because the other branch is turned on. Both secondary-side switch devices F1 and F2 with the GATE_F input signal must sustain any overshoot voltage because these devices are blocking during the illustrated power transfer interval. The secondary-side switch devices E1 and E2 with the GATE_E input signal must sustain any overshoot voltage during the immediately following power transfer interval because these devices would be blocking in that power transfer interval. The secondary-side switch devices E1, E2, F1 and F2 effectively function as diodes in FIGS. 2A through 2D, and hence the corresponding gate signals are grounded (or similar) during this part of operation. The secondary-side switch devices E1, E2, F1 and F2 function as synchronous rectifiers during the part of operation shown in FIGS. 2E and 2F.

Figure 2E:
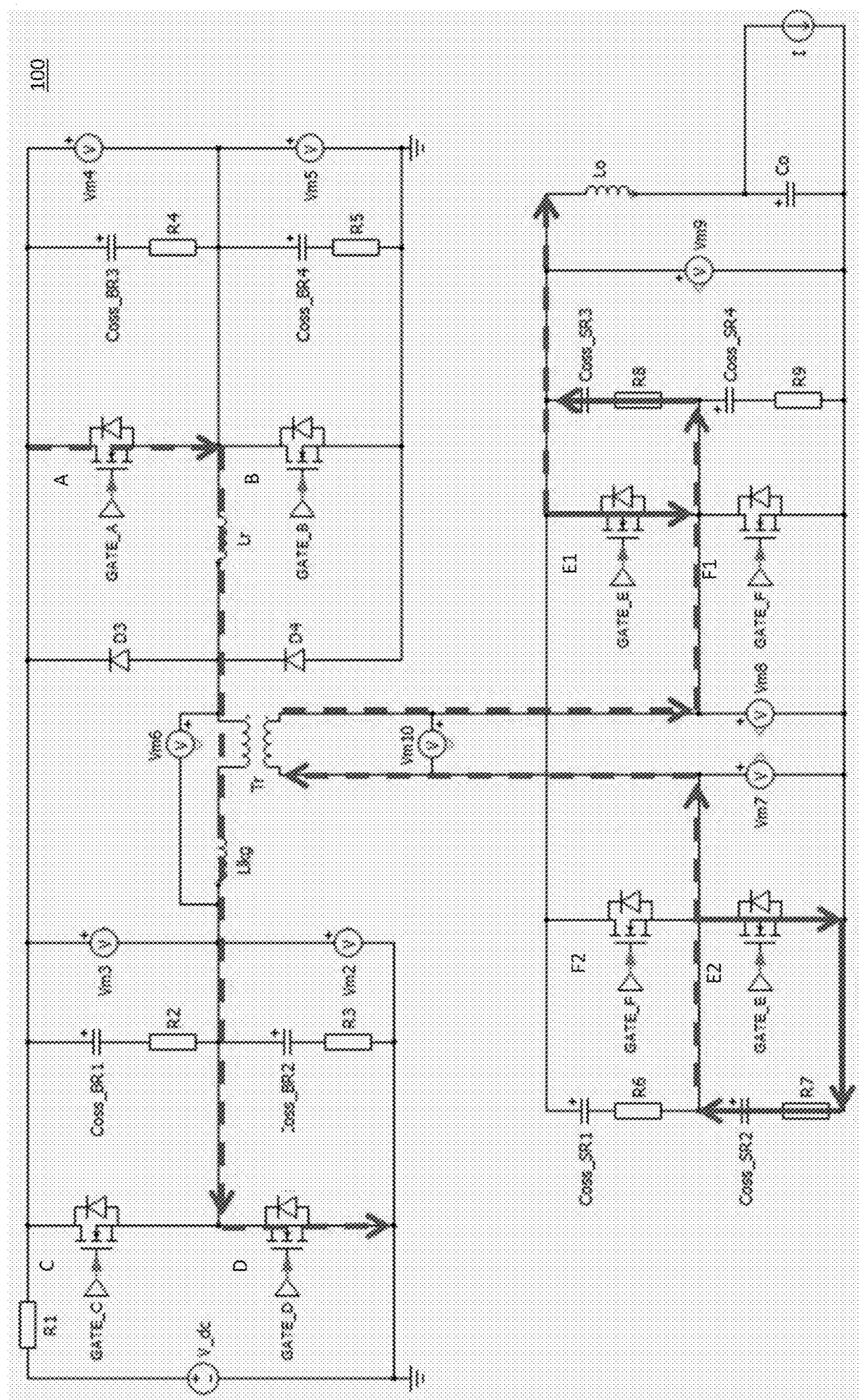
Figure 2E:
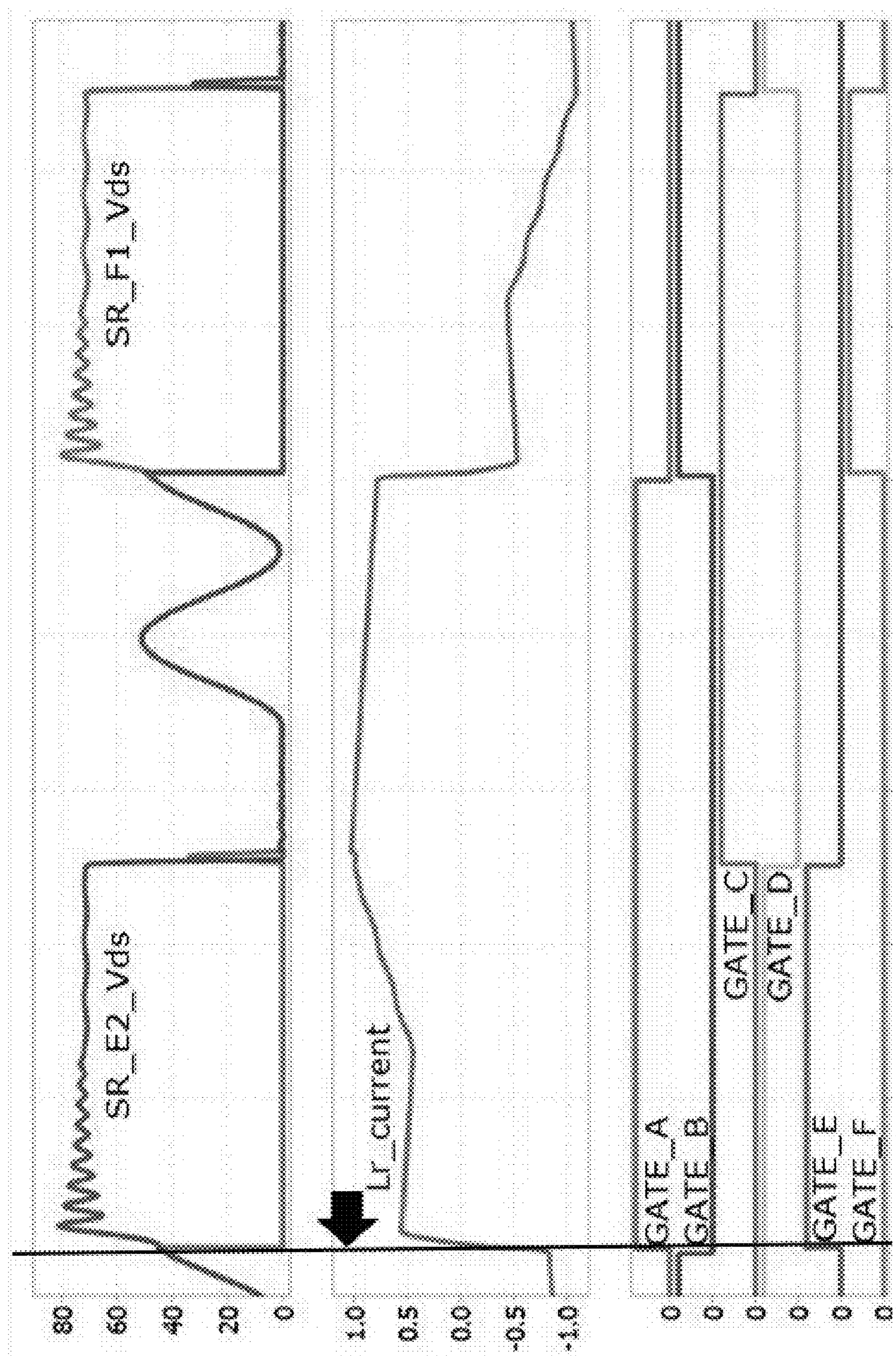

FIG. 2E shows the phase-shift full bridge power converter 100 as the voltage Coss_SRx_V on the secondary-side switch device output capacitance Coss_SRx is discharged while the transformer voltage Vm10 builds up. As the transformer voltage Vm10 first begins to rise at the start of a new power transfer interval in DCM, the power converter controller 106 hard switches on the branch of the secondary-side rectification stage 104 that is to be conducting during the new power transfer interval. This way, the branch of the secondary-side rectification stage 104 that is hard switched on begins dissipating charge stored in the capacitance Coss_SRx of the branches of the rectification stage 104 when the transformer voltage Vm10 first begins to rise. That is, the hard switched on rectification branch removes the stored charge in Coss_SRx before the transformer voltage Vm10 builds up so that the stored charge in Coss_SRx does not sum up and create and overshoot problem.

The voltage 'clamping' provided by hard switching on the corresponding rectification branch dissipates the voltage right before power transfer starts and therefore stops or at least diminishes the resonance on the secondary side of the power converter 100. The charge may be transferred to the output capacitor Co and/or dissipated in the channel of the secondary-side switch devices that are hard switched on, so that the charge does not increase overshoot. In the example illustrated in FIGS. 2A through 2F, the rectification branch formed by switch devices E1 and E2 is hard switched on as the transformer voltage Vm10 first begins to rise at the start of the power transfer interval. For the immediately following power transfer interval, the controller 106 will hard switch on the rectification branch formed by switch devices F1 and F2. FIG. 2E shows the current (Lr_current) for the stray inductance and external resonant inductance (Lr) of the power converter 100 instead of the output inductor current Lo_current. The dashed lines in FIG. 2E represent current that is building up when the transformer Tr starts to conduct in the other direction.

Figure 2F:
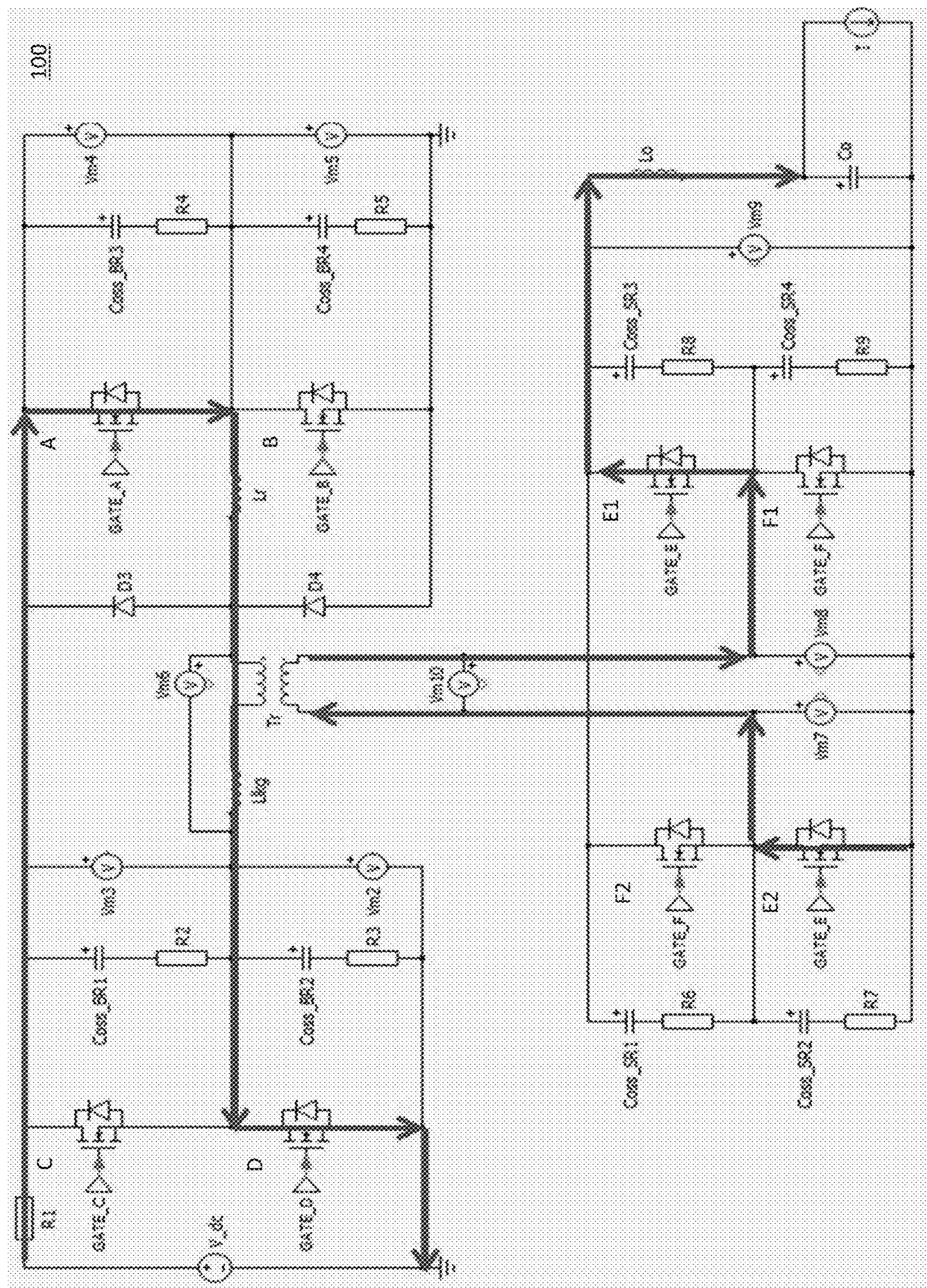
Figure 2F:
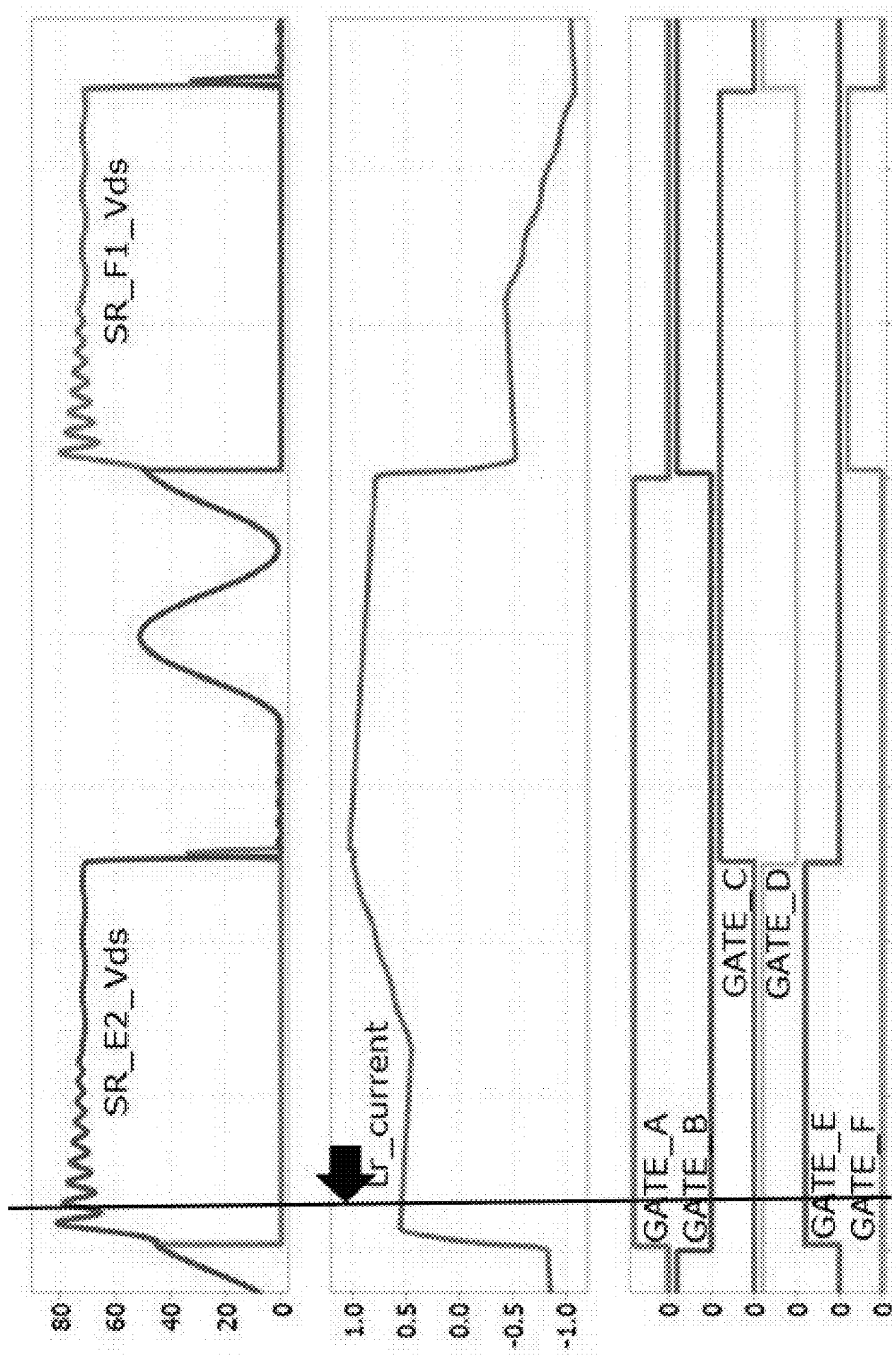

FIG. 2F shows the phase-shift full bridge power converter 100 at the beginning of the new power transfer interval. Power transfer starts without Lo-Coss_SRx induced overshoot. The Lo-Coss_SRx induced overshoot shown in FIG. 2F is from the resonance between the leakage (Llkg) of the transformer Tr and the secondary-side switch device output capacitance Coss_SRx. This overshoot is relatively low energy and high frequency due to the small size of the leakage (Llkg) of the transformer Tr, and may be snubbed if desired. FIG. 2F also shows the current Lr_current for the stray inductance and external resonant inductance Lr of the power converter 100 instead of the output inductor current Lo_current.

The proper timing for hard switching on the branch (E1+E2 or F1+F2) of the secondary-side rectification stage 104 that is to be conducting during the new power transfer interval, as the transformer voltage Vm10 first begins to rise at the start of the new power transfer interval in DCM, depends on the resonant elements of the primary and secondary sides of the phase-shift full bridge power converter 100. Other minor contributions may be ignored.

In an embodiment, the power converter controller 106 hard switches on the branch (E1+E2 or F1+F2) of the secondary-side rectification stage 104 that is to be conducting during the new power transfer interval at a predetermined time which is based on: leakage Llkg of the transformer Tr; stray inductance and external resonant inductance Lr; and capacitance Coss_SRx of the branches (E1+E2 and F1+F2) of the rectification stage 104 on the secondary side. The predetermined time is the time taken by the primary side to charge up the secondary side capacitances Coss_SRx with the inductances in series.

In another embodiment, the power converter controller 106 hard switches on the branch (E1+E2 or F1+F2) of the secondary-side rectification stage 104 that is to be conducting during the new power transfer interval at a predetermined time which is selected to minimize voltage overshot experienced by the branch (E1+E2 or F1+F2) of the rectification stage 104 that is blocking during the new power transfer interval, wherein the voltage overshoot is caused by the charge stored in the capacitance Coss_SRx of the branches (E1+E2 and F1+F2) of the rectification stage 104 between power transfer intervals due to resonance that occurs on the secondary side during DCM.

Figure 3:
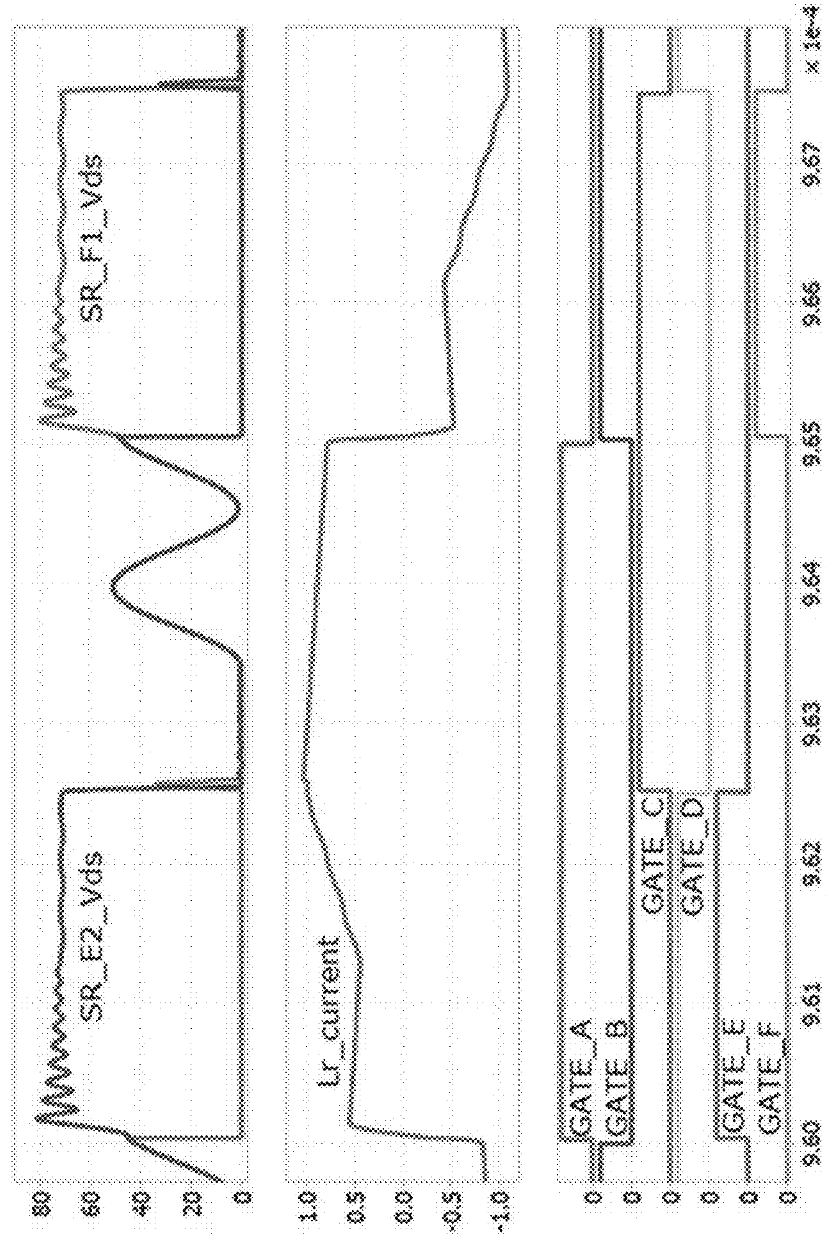
FIG. 3 illustrates an embodiment of control signalling for mitigating drain voltage overshoot on the secondary side of the converter during DCM operation, and corresponding waveforms.

FIG. 3 illustrates an embodiment in which the power converter controller 106 links or relates the control signals GATE_E and GATE_F for the switch devices E1 through F2 of the rectification stage 104 on the secondary side to the control signals GATE_A, GATE_B, GATE_C and GATE_D for the switch devices A through D of the power stage 102 on the primary side. For example, the controller 106 may activate the control signal (GATE_E or GATE_F) for the corresponding synchronous rectifier branch (E1+E2 or F1+F2) on the secondary side at a time after the corresponding primary-side control signals do a transition to a power transfer state—i.e. overlapping gates of a diagonal (branch) in the primary side power stage 104: A+D or B+C.

In another embodiment, the power converter controller 106 hard switches on the branch (E1+E2 or F1+F2) of the secondary-side rectification stage 104 that is to be conducting during the new power transfer interval after a delay from when the controller 106 activates the branch (A+D or C+B) of the primary-side power transfer stage 102 that is to be conducting during the new power transfer interval. The delay is given by:

$$\text{delay} = \frac{2 * \pi * \sqrt{(L_r + L_{lkg}) * \left(\frac{Coss_{SRx}}{2}\right)}}{2}, \tag{1}$$

where $L_{lkg}$ is leakage of the transformer Tr, L are stray inductance and external resonant inductance, and $Coss_{SRx}$ is capacitance of the branches (E1+E2 and F1+F2) of the secondary-side rectification stage 104 which store charge between power transfer intervals due to resonance that occurs on the secondary side during DCM.

Figure 4:
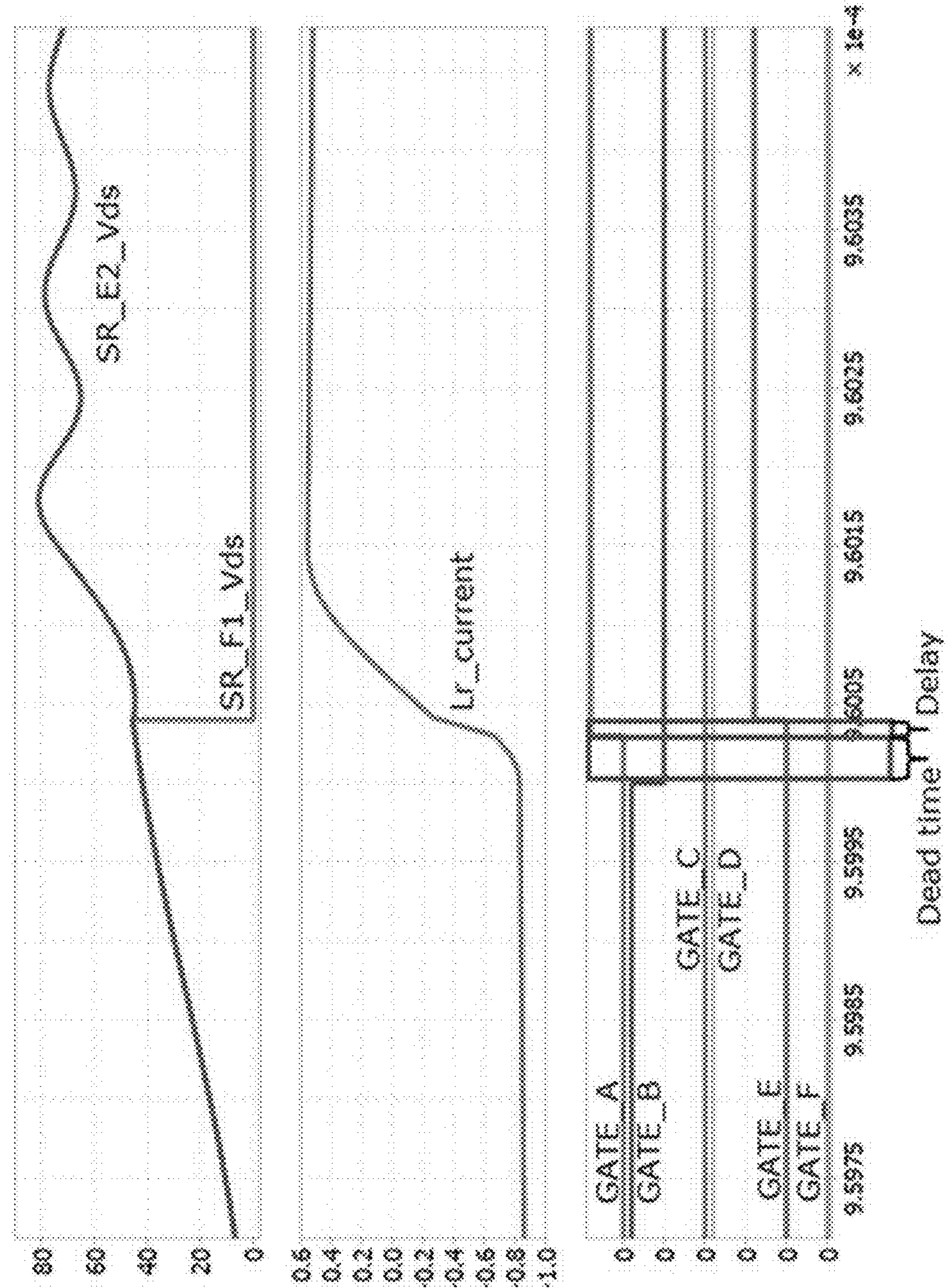
FIG. 4 illustrates another embodiment of control signalling for mitigating drain voltage overshoot on the secondary side of the converter during DCM operation, and corresponding waveforms.

FIG. 4 illustrates an embodiment in which the power converter controller 106 uses a timer to determine when to hard switch on the branch (E1+E2 or F1+F2) of the secondary-side rectification stage 104 that is to be conducting during the new power transfer interval. According to this embodiment, the controller 106 starts the timer at the end of a dead time ('Dead time') for the corresponding switch devices (A+D or B+C) of the branch of the primary-side power transfer stage 102 that is to be conducting during the new power transfer interval. The power stage branch (A+D or B+C) begins transferring power to the secondary side at the end of the dead time. The timer implemented by the controller 106 provides an additional delay ('Delay') from when the power stage branch (A+D or B+C) begins transferring power to the secondary side.

The power converter controller 106 hard switches on the branch (E1+E2 or F1+F2) of the secondary-side rectification stage 104 that is to be conducting during the new power transfer interval when the timer expires. In the DCM example shown in FIG. 4, the controller 106 activates signal GATE_E when the timer expires. The overlap of signal GATE_A with signal GATE_D begins a new power transfer in which the power stage branch formed by switch devices A and D side begins transferring power to the secondary side. Just prior to beginning the power transfer, a dead time ('Dead time') is instituted whereby primary-side power stage branch A+D is not activated because signal GATE_A remains low. The timer implemented by the controller 106 expires after a delay ('Delay') from the end of the dead time. The corresponding rectification branch (E1+E2 in the illustrated example) on the secondary side is hard switched on when the timer expires and the controller 106 activates signal GATE_E. For the power transfer interval involving the complimentary primary and secondary side branches of the power converter, the primary-side power stage branch formed by switch devices B and C begins transferring power during the next power transfer interval after a dead time, the timer expires after a delay from the end of the dead time, and the controller 106 activates signal GATE_F when the timer expires to hard switch on the secondary-side rectification branch formed by switch devices F1 and F2.

In one embodiment, after hard switching on the branch (E1+E2 or F1+F2) of the secondary-side rectification stage 104 that is to be conducting during a new power transfer interval, the controller 106 maintains activation of the hard switched on branch of the rectification stage 104 so long as both switch devices of the branch (A+D or C+B) of the primary-side power transfer stage 102 that is conducting during the new power transfer interval remain on. According to this embodiment, the controller 106 keeps the corresponding branch (E1+E2 or F1+F2) of the rectification stage 104 on the secondary side active (conducting or switched on) in DCM only during the primary bridge diagonal overlap. For example, the controller 106 may deactivate signal GATE_E at the same time or nearly the same time when signal GATE_D is deactivated. This way, secondary-side switch device E2 is switched off when primary-side switch device A is switched off. For the power transfer interval involving the complimentary primary and secondary side branches of the power converter, the controller 106 may deactivate signal GATE_F at the same time or nearly the same time when signal GATE_B is deactivated. This way, secondary-side switch device F1 is switched off when primary-side switch device C is switched off.

Figure 5:
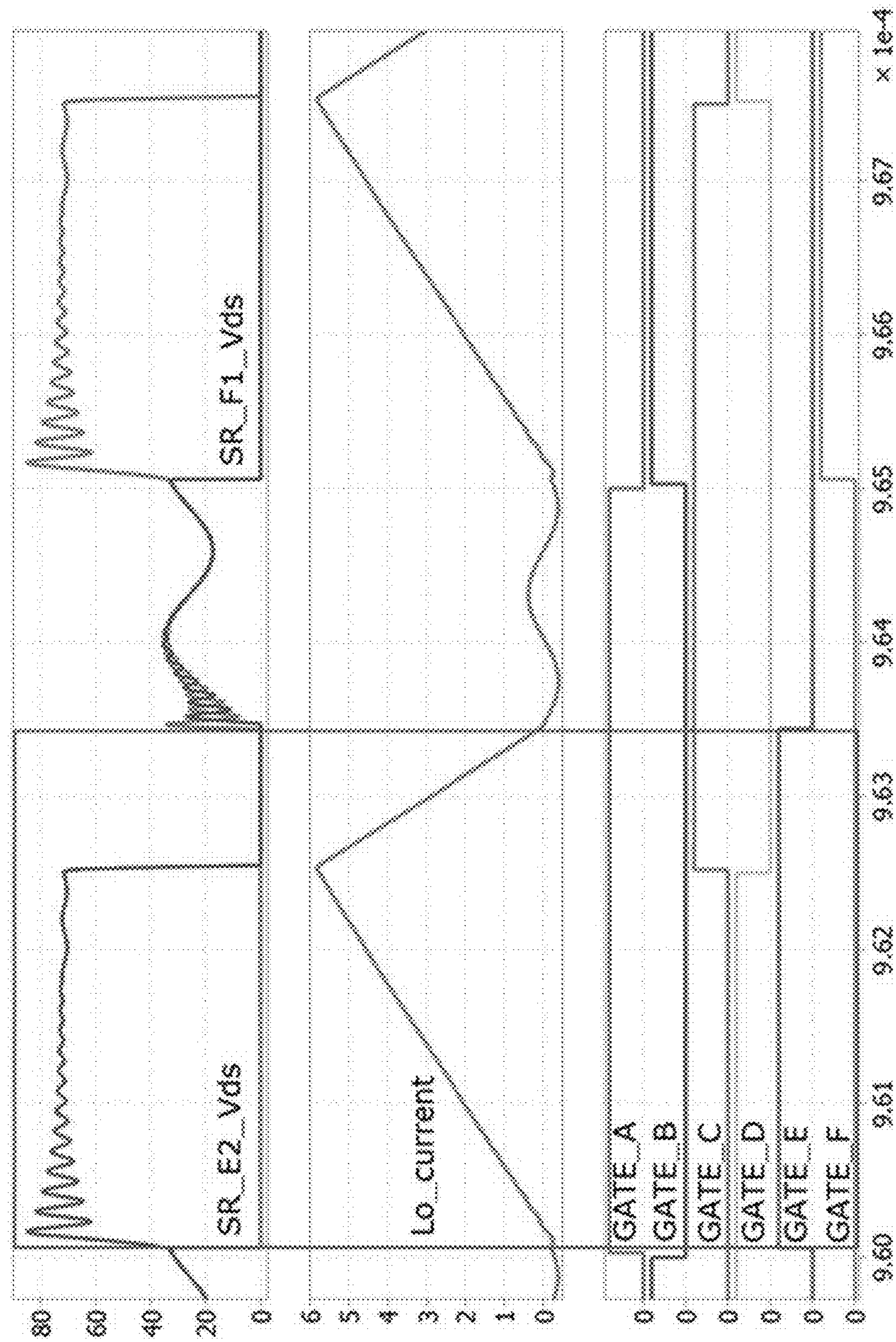
FIG. 5 illustrates another embodiment of control signalling for mitigating drain voltage overshoot on the secondary side of the converter during DCM operation, and corresponding waveforms.

FIG. 5 illustrates another embodiment in which after hard switching on the branch (E1+E2 or F1+F2) of the secondary-side rectification stage 104 that is to be conducting during the new power transfer interval, the power converter controller 106 maintains activation of the hard switched on rectification branch until current of the output filter inductor Lo_current returns to zero or near zero. For example, the controller 106 may deactivate signal GATE_E when the output filter inductor Lo_current returns to zero or near zero as shown in FIG. 5. For the power transfer interval involving the other primary and secondary side branches (C+B on the primary side and F2+F1 on the secondary side) of the power converter 100, the controller 106 may deactivate signal GATE_F when the output filter inductor Lo_current returns to zero or near zero. With this approach, the corresponding low-side switch device (F1 or E2) on the secondary side may remain on while current is positive through the output inductor Lo to reduce conduction losses. Any standard current sensor or estimator may be used or implemented by the controller 106 for determining when the output filter inductor Lo_current returns to zero or near zero.

The timing for hard switching on the branches (E1+E2 and F1+F2) of the rectification stage 104 on the secondary side to mitigate drain voltage overshoot may be adjusted experimentally to ensure the lowest drain voltage overshoot under all operating conditions of interest. If the corresponding secondary-side rectification branch (E1+E2 or F1+F2) is hard switched on too early, more current will charge up in the output inductor Lo and the drain voltage overshoot will increase. For example, if the controller 106 activates the corresponding secondary-side control signal (GATE_E or GATE_F) before the transformer voltage Vm10 starts to rise at the beginning of a new power transfer interval, the negative current in the output inductor Lo becomes more negative and the drain voltage overshoot increases. If the rectification branch (E1+E2 or F1+F2) is hard switched on too late, the drain voltage overshoot also increases.

The optimal timing for hard switching on the secondary-side rectification branches (E1+E2 and F1+F2) of the power converter 100 may be determined by changing the delay illustrated in FIG. 4 until an optimal point reached. This delay may then be set in the controller 106. In one embodiment, the delay is defined as a window. For example, a delay window of about 30 to 40 ns may be adequate to avoid problematic overshoot.

The hard switching technique described herein is applied under light-load conditions. Heretofore, the hard switching technique was described for DCM. However, the hard switching technique may be used under even lighter load conditions. For example, the power converter 100 may enter a burst mode in which the controller 106 modulates the switching frequency over a large range to maintain the output voltage. This condition may persist until the load current reaches a threshold for the power converter 100 to reenter active PWM operation.

Figure 6:
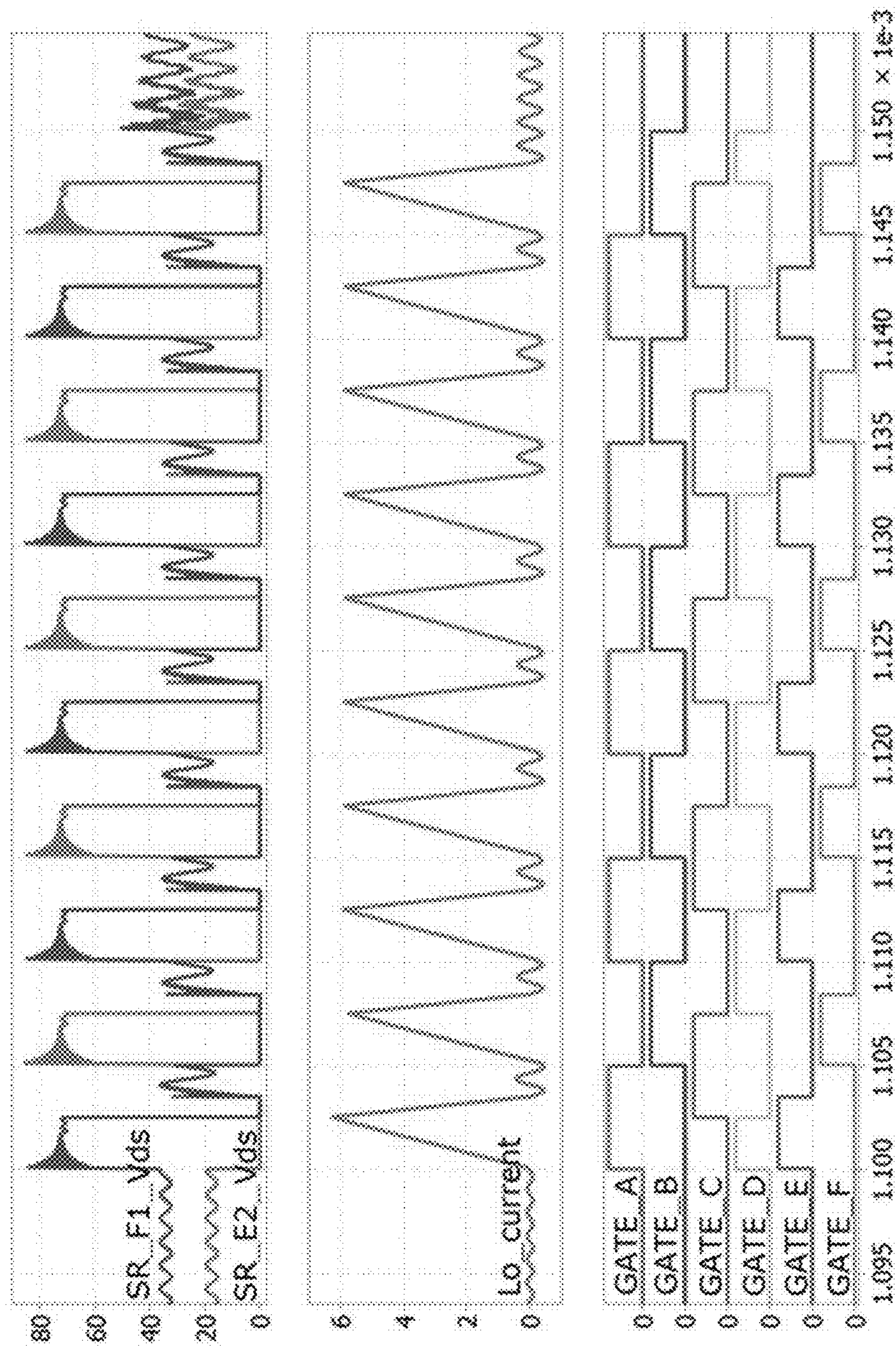
FIG. 6 illustrates an embodiment of control signalling for mitigating drain voltage overshoot on the secondary side of the converter during burst mode operation, and corresponding waveforms.

FIG. 6 illustrates an embodiment of a driving scheme implemented by the power converter controller 106 during burst mode, starting from the first pulse after re-starting primary-side switching. The secondary-side switch devices E1 through F2 are conventionally turned off all the time in burst mode. However, in the illustrated embodiment, the controller 106 controls the switch devices in burst mode under lower power demand than in DCM, so that energy is transferred from the primary side to the secondary side during a power transfer interval in which one branch (A+D or C+B) of the primary-side power transfer stage 102 is conducting, one branch (E1+E2 or F1+F2) of the secondary-side rectification stage 104 is conducting and the other branch of the rectification stage 104 is blocking. As the transformer voltage Vm10 first begins to rise at the start of a new power transfer interval in the burst mode, the controller 106 hard switches on the branch (E1+E2 or F1+F2) of the secondary-side rectification stage 104 that is to be conducting during the new power transfer interval. This way, the branch (E1+E2 or F1+F2) of the rectification stage 104 on the secondary side that is hard switched on begins dissipating charge stored in the capacitance (Coss_SR1, Coss_SR2, Coss_SR3, Coss_SR4) of the secondary-side rectification branches (E1+E2 and F1+F2) when the transformer voltage Vm10 first begins to rise. The hard switching can be seen in the signals GATE_E and GATE_F in FIG. 6 for alternating power transfer intervals. The controller 106 may employ the same or different delay time in DCM and burst mode. If the same delay is used, the resonance in both modes on the secondary side is effectively constant.

The hard switching embodiments described above are in the context of a power converter with a phase-shift full bridge topology. However, the hard switching embodiments are readily applicable to other types of power converter topologies such as current doubler and center-tapped rectifiers.

Figure 7:
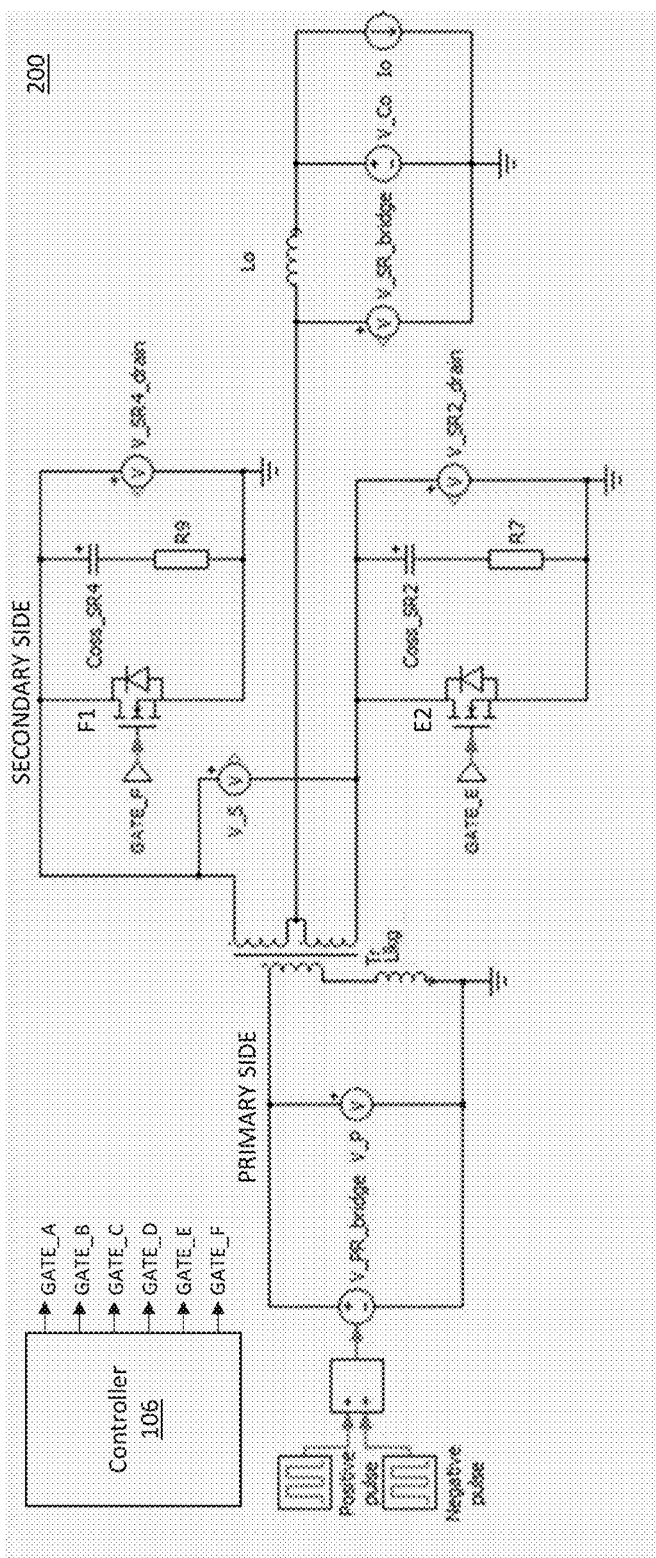
FIG. 7 illustrates a schematic diagram of an embodiment of a power converter having a center-tapped topology and which mitigates drain voltage overshoot on the secondary side during DCM operation.

FIG. 7 illustrates an embodiment of a power converter 200 having a center-tapped topology. The hard switching embodiments described above for the power converter 100 with the phase-shift full bridge topology may be implemented in the same manner for the power converter 200 with the center-tapped topology. In a center tapped configuration, the blocking voltage on the secondary side is twice the input voltage V_dc multiplied by the turns ratio of the transformer Tr. The control signaling described herein for the power converter 100 with the phase-shift full bridge topology is the same for the power converter 200 with the center-tapped topology. The primary side of the power converter 200 is shown simplified, with a generic input source that provides positive and negative pulses. The secondary side has a single rectification branch (F1+E2) due to the center-tapped topology of the converter 200. Various voltages at different nodes in the power converter 200 are illustrated as voltage sources (V_x), various resistances are illustrated as resistors (Rx), and various capacitances are illustrated as capacitors (Coss_x). The load is illustrated as a current source Io.

Figure 8:
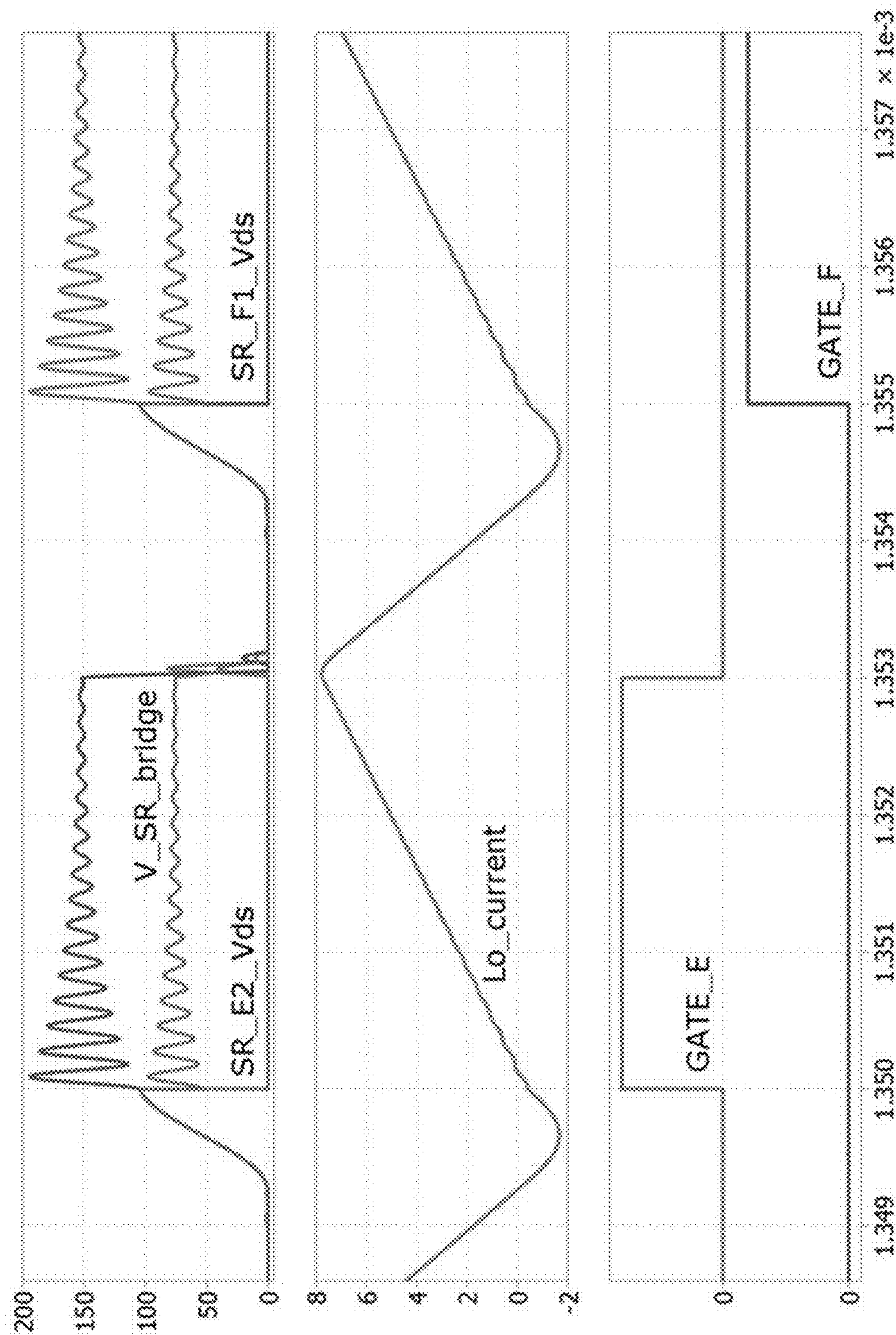
FIG. 8 illustrates an embodiment of control signalling for mitigating drain voltage overshoot on the secondary side of the converter shown in FIG. 7 during DCM operation, and corresponding waveforms.

FIG. 8 illustrates the secondary-side control signals GATE_E and GATE_F generated by the controller 106 for two consecutive power transfer intervals of the power converter 200 with the center-tapped topology. FIG. 8 also illustrates the output inductor current (Lo_current), the resonant voltage (SR_F1_Vds) across high-side switch device F1 on the secondary side, the resonant voltage (SR_E2_Vds) across low-side switch device E2 on the secondary side, and the voltage (V_SR_bridge) resonating at the center-tapped output of power converter 200 on the secondary side. The overshoot present in SR_F1_Vds and SR_E2_Vds is induced by the resonance between the leakage (Llkg) of the transformer Tr and the secondary-side switch device output capacitance Coss_SRx. This overshoot is relatively low energy and high frequency due to the small size of the leakage (Llkg) of the transformer Tr, and may be snubbed if desired.

Figure 9:
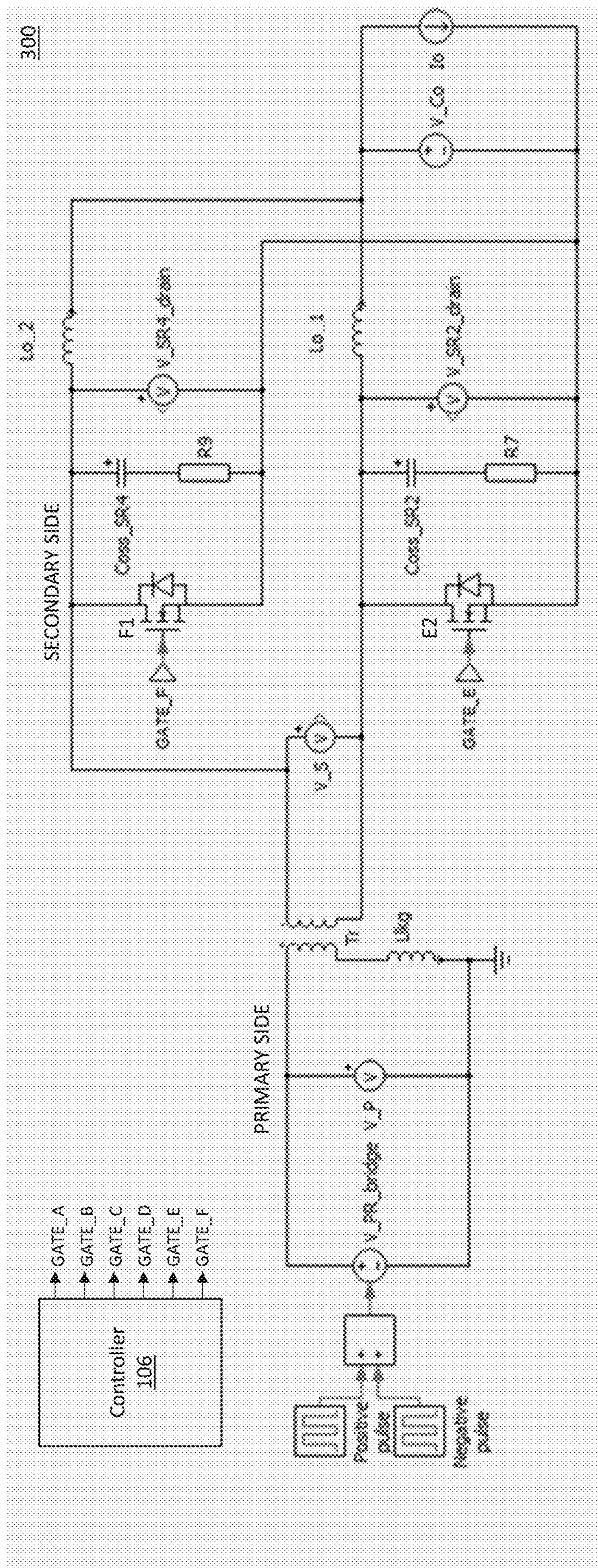
FIG. 9 illustrates a schematic diagram of an embodiment of a power converter having a current doubler topology and which mitigates drain voltage overshoot on the secondary side during DCM operation.

FIG. 9 illustrates an embodiment of a power converter 300 having a current doubler topology. The hard switching embodiments described above for the power converter 100 with the phase-shift full bridge topology may be implemented in the same manner for the power converter 300 with the current doubler topology. The current doubler topology is typically used in low voltage, high current applications. The current doubler uses two output inductors Lo_1, Lo_2, each carrying half the total load current and operating at half the switching frequency. The control signaling described herein for the power converter 100 with the phase-shift full bridge topology is the same for the power converter 300 with the current doubler topology. The primary side of the power converter 300 is shown simplified, with a generic input source that provides positive and negative pulses. The secondary side has a single rectification branch (F1+E2) due to the current doubler topology of the converter 300. Various voltages at different nodes in the power converter 300 are illustrated as voltage sources (V_x), various resistances are illustrated as resistors (Rx), and various capacitances are illustrated as capacitors (Coss_x). The load is illustrated as a current source Io.

Figure 10:
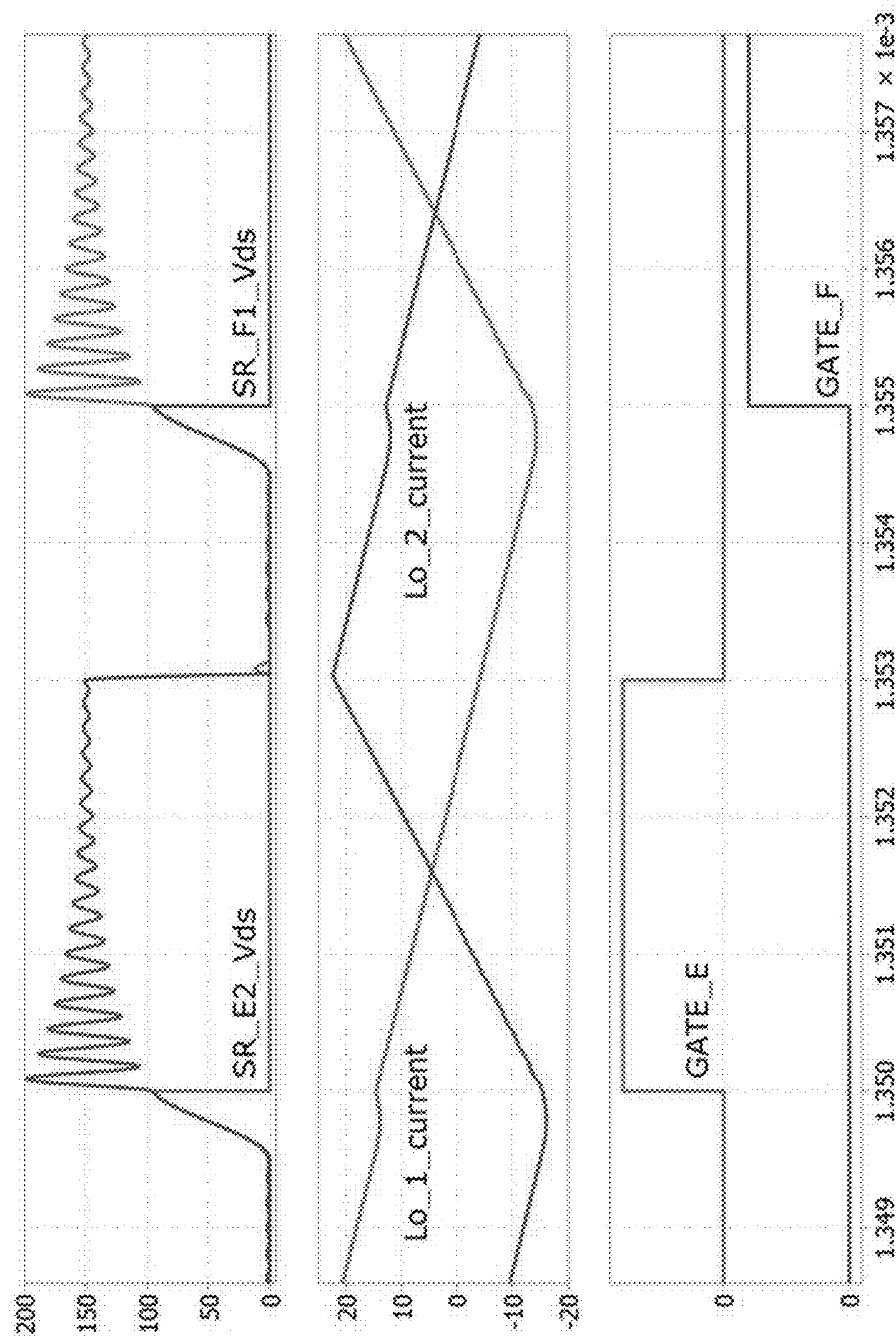
FIG. 10 illustrates an embodiment of control signalling for mitigating drain voltage overshoot on the secondary side of the converter shown in FIG. 9 during DCM operation, and corresponding waveforms.

FIG. 10 illustrates the secondary-side control signals GATE_E and GATE_F generated by the controller 106 for two consecutive power transfer intervals of the power converter 300 with the current doubler topology. FIG. 10 also illustrates both output inductor currents (Lo_1_current; Lo_2_current), the resonant voltage (SR_F1_Vds) across high-side switch device F1 on the secondary side and the resonant voltage (SR_E2_Vds) across low-side switch device E2 on the secondary side. The overshoot present in SR_F1_Vds and SR_E2_Vds is induced by the resonance between the leakage (Llkg) of the transformer Tr and the secondary-side switch device output capacitance Coss_SRx. This overshoot is relatively low energy and high frequency due to the small size of the leakage (Llkg) of the transformer Tr, and may be snubbed if desired.

Figure 11:
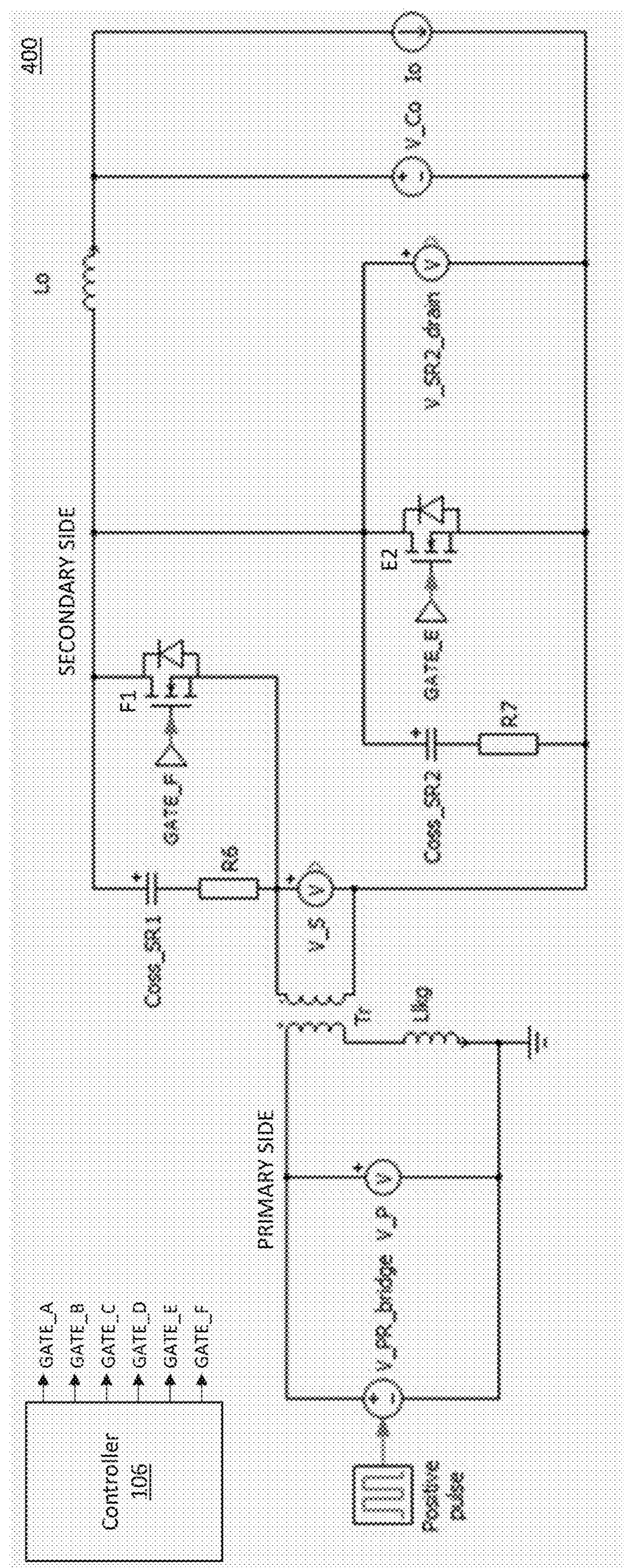
FIG. 11 illustrates a schematic diagram of another embodiment of a power converter having a current doubler topology and which mitigates drain voltage overshoot on the secondary side during DCM operation.

FIG. 11 illustrates an embodiment of a power converter 400 having a current doubler topology for use in a two-level primary voltage of a transformer. The hard switching embodiments described above for the power converter 100 with the phase-shift full bridge topology may be implemented in the same manner for the power converter 400 with the current doubler topology. The primary side of the power converter 400 is shown simplified, with a generic input source that provides only positive pulses. The secondary side has a single rectification branch (F1+E2) due to the current doubler topology of the converter 400. Various voltages at different nodes in the power converter 400 are illustrated as voltage sources (V_x), various resistances are illustrated as resistors (Rx), and various capacitances are illustrated as capacitors (Coss_x). The load is illustrated as a current source Io.

Figure 12:
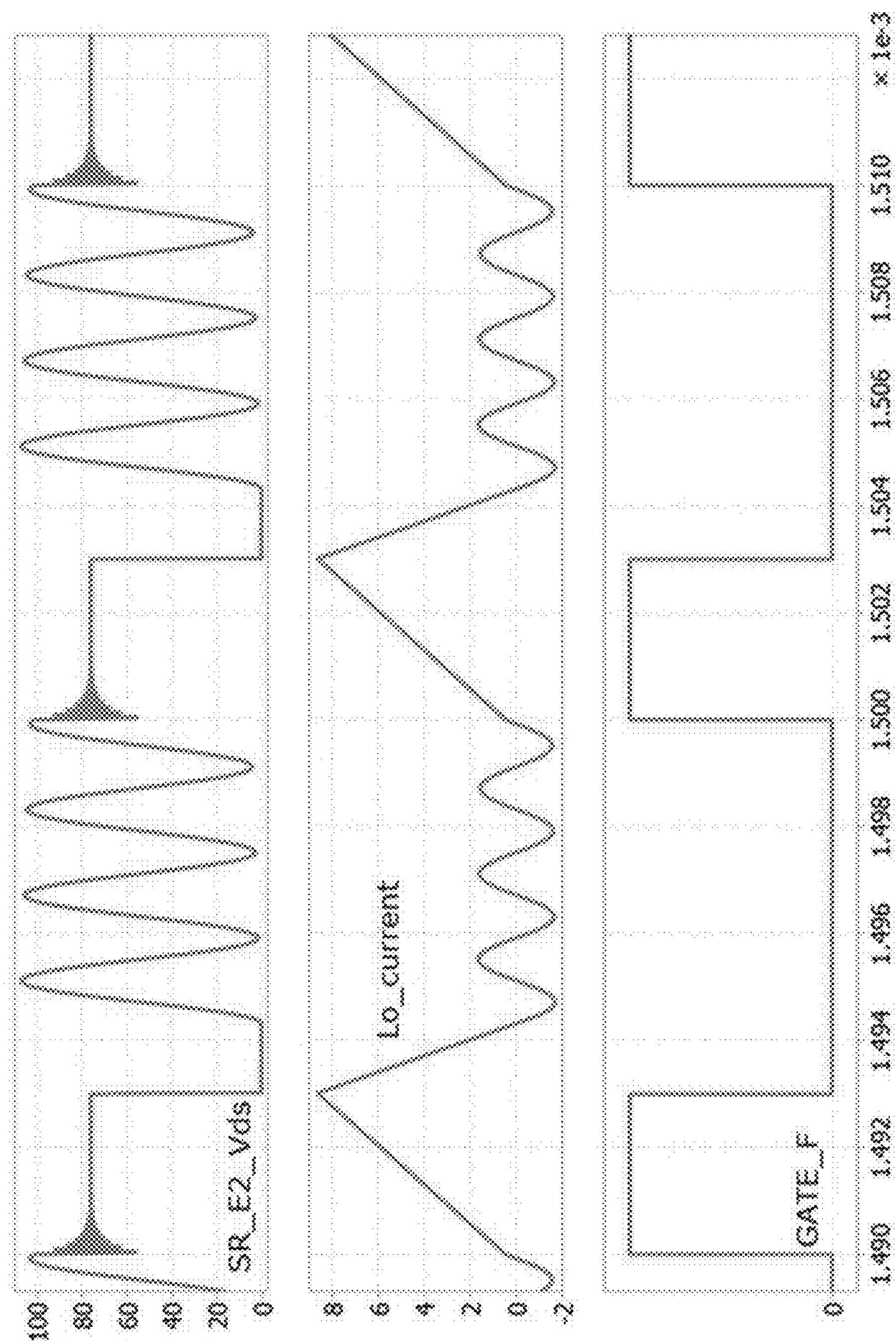
FIG. 12 illustrates an embodiment of control signalling for mitigating drain voltage overshoot on the secondary side of the converter shown in FIG. 11 during DCM operation, and corresponding waveforms.

FIG. 12 illustrates the secondary-side control signals GATE_E and GATE_F generated by the controller 106 for two consecutive power transfer intervals of the power converter 400 with the current doubler topology shown in FIG. 11. FIG. 12 also illustrates the output inductor current (Lo_current) and the resonant voltage (SR_E2_Vds) across low-side switch device E2 on the secondary side. The overshoot present in SR_E2_Vds is induced by the resonance between the leakage (Llkg) of the transformer Tr and the secondary-side switch device output capacitance Coss_SRx. This overshoot is relatively low energy and high frequency due to the small size of the leakage (Llkg) of the transformer Tr, and may be snubbed if desired.

Terms such as “first”, “second”, and the like, are used to describe various elements, regions, sections, etc. and are also not intended to be limiting. Like terms refer to like elements throughout the description.

As used herein, the terms “having”, “containing”, “including”, “comprising” and the like are open ended terms that indicate the presence of stated elements or features, but do not preclude additional elements or features. The articles “a”, “an” and “the” are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter, comprising: a primary side comprising switch devices that form a power transfer stage; a secondary side comprising switch devices that form a rectification stage and an output filter coupled to the rectification stage, the output filter comprising an output inductor and an output capacitor; a transformer coupling the primary side and the secondary side; and a controller operable to control the switch devices in DCM (discontinuous conduction mode), to transfer energy from the primary side to the secondary side during a power transfer interval in which one branch of the power transfer stage is conducting, one branch of the rectification stage is conducting and another branch of the rectification stage is blocking, wherein in DCM, resonance occurs between the output filter inductor and an output capacitance of the rectification stage when current in the output filter inductor becomes discontinuous, wherein the resonance between the output filter inductor and the output capacitance of the rectification stage in DCM causes pre-charging of the output capacitance of the rectification stage prior to the primary side staffing a new power transfer interval, wherein as a voltage of the transformer first begins to rise at the start of the new power transfer interval in DCM, the controller is operable to hard switch on the branch of the rectification stage that is to be conducting during the new power transfer interval, so that the branch of the rectification stage that is hard switched on begins dissipating the charge stored in the output capacitance of the rectification stage when the transformer voltage first begins to rise, the charge being transferred to the output capacitor of the output filter and/or dissipated in a channel of the branch of the rectification stage that is hard switched on.

2. The power converter of claim 1, wherein the controller is operable to hard switch on the branch of the rectification stage that is to be conducting during the new power transfer interval at a predetermined time which is based on: leakage of the transformer; stray inductance and external resonant inductance; and the capacitance of the the rectification stage on the secondary side.

3. The power converter of claim 1, wherein the controller is operable to hard switch on the branch of the rectification stage that is to be conducting during the new power transfer interval at a predetermined time which is selected to minimize voltage overshot experienced by the branch of the rectification stage that is blocking during the new power transfer interval, the voltage overshoot caused by charge stored in the capacitance of the rectification stage between power transfer intervals due to the resonance that occurs on the secondary side during DCM.

4. The power converter of claim 1, wherein the controller is operable to hard switch on the branch of the rectification stage that is to be conducting during the new power transfer interval after a delay from when the controller activates the branch of the power transfer stage that is to be conducting during the new power transfer interval, and wherein the delay is given by:

$$\text{delay} = \frac{2 * \pi * \sqrt{(L_r + L_{lkg}) * \left(\frac{Coss_{SRx}}{2}\right)}}{2},$$

where $L_{lkg}$ is leakage of the transformer, $L_r$ are stray inductance and external resonant inductance, and $Coss_{SRx}$ is the capacitance of the rectification stage which store charge between power transfer intervals due to the resonance that occurs on the secondary side during DCM.

5. The power converter of claim 1, wherein after hard switching on the branch of the rectification stage that is to be conducting during the new power transfer interval, the controller is operable to maintain activation of the branch of the rectification stage that is hard switched on so long as both switch devices of the branch of the power transfer stage that is conducting during the new power transfer interval remain on.

6. The power converter of claim 1, wherein after hard switching on the branch of the rectification stage that is to be conducting during the new power transfer interval, the controller is operable to maintain activation of the branch of the rectification stage that is hard switched on until current of the output filter inductor returns to zero or near zero.

7. The power converter of claim 1, wherein the controller is operable to start a timer at an end of a dead time for the switch devices of the branch of the power transfer stage that is to be conducting during the new power transfer interval, and wherein the controller is operable to hard switch on the branch of the rectification stage that is to be conducting during the new power transfer interval when the timer expires.

8. The power converter of claim 7, wherein after hard switching on the branch of the rectification stage that is to be conducting during the new power transfer interval, the controller is operable to maintain activation of the branch of the rectification stage that is hard switched on so long as both switch devices of the branch of the power transfer stage that is conducting during the new power transfer interval remain on.

9. The power converter of claim 1, wherein the controller is operable to control the switch devices in a burst mode under lower power demand than in DCM, to transfer energy from the primary side to the secondary side during a power transfer interval in which one branch of the power transfer stage is conducting, one branch of the rectification stage is conducting and another branch of the rectification stage is blocking, and wherein as the transformer voltage first begins to rise at the start of a new power transfer interval in the burst mode, the controller is operable to hard switch on the branch of the rectification stage that is to be conducting during the new power transfer interval, so that the branch of the rectification stage that is hard switched on begins dissipating charge stored in the capacitance of the rectification stage when the transformer voltage first begins to rise.

10. The power converter of claim 1, wherein the power converter has a phase-shift full bridge converter topology.

11. The power converter of claim 1, wherein the power converter has a current doubler topology.

12. A method of operating a power converter having a primary side with switch devices that form a power transfer stage, a secondary side with switch devices that form a rectification stage and an output filter coupled to the rectification stage, the output filter comprising an output inductor and an output capacitor, and a transformer coupling the primary side and the secondary side, the method comprising: controlling the switch devices in DCM (discontinuous conduction mode), to transfer energy from the primary side to the secondary side during a power transfer interval in which one branch of the power transfer stage is conducting, one branch of the rectification stage is conducting and another branch of the rectification stage is blocking, wherein in DCM, resonance occurs between the output filter inductor and an output capacitance of the rectification stage when current in the output filter inductor becomes discontinuous, wherein the resonance between the output filter inductor and the output capacitance of the rectification stage in DCM causes pre-charging of the output capacitance of the rectification stage prior to the primary side starting a new power transfer interval; and as a voltage of the transformer first begins to rise at the start of the new power transfer interval in DCM, hard switching on the branch of the rectification stage that is to be conducting during the new power transfer interval, so that the branch of the rectification stage that is hard switched on begins dissipating the charge stored in the output capacitance of the rectification stage when the transformer voltage first begins to rise, the charge being transferred to the output capacitor of the output filter and/or dissipated in a channel of the branch of the rectification stage that is hard switched on.

13. The method of claim 12, wherein hard switching on the branch of the rectification stage that is to be conducting during the new power transfer interval comprises:

hard switching on the branch of the rectification stage that is to be conducting during the new power transfer interval at a predetermined time which is based on: leakage of the transformer; stray inductance and external resonant inductance; and the capacitance of the rectification stage on the secondary side.

14. The method of claim 12, wherein hard switching on the branch of the rectification stage that is to be conducting during the new power transfer interval comprises:

hard switching on the branch of the rectification stage that is to be conducting during the new power transfer interval at a predetermined time which is selected to minimize voltage overshot experienced by the branch of the rectification stage that is blocking during the new power transfer interval, the voltage overshoot caused by charge stored in the capacitance of the rectification stage between power transfer intervals due to the resonance that occurs on the secondary side during DCM.

15. The method of claim 12, wherein hard switching on the branch of the rectification stage that is to be conducting during the new power transfer interval comprises:

hard switching on the branch of the rectification stage that is to be conducting during the new power transfer interval after a delay from when the controller activates the branch of the power transfer stage that is to be conducting during the new power transfer interval, and wherein the delay is given by:

$$\text{delay} = \frac{2 * \pi * \sqrt{(L_r + L_{lkg}) * \left(\frac{Coss_{SRx}}{2}\right)}}{2},$$

where $L_{lkg}$ is leakage of the transformer, $L_r$ are stray inductance and external resonant inductance, and $Coss_{SRx}$ is the capacitance of the rectification stage which store charge between power transfer intervals due to the resonance that occurs on the secondary side during DCM.

16. The method of claim 12, further comprising:

wherein after hard switching on the branch of the rectification stage that is to be conducting during the new power transfer interval, maintaining activation of the branch of the rectification stage that is hard switched on so long as both switch devices of the branch of the power transfer stage that is conducting during the new power transfer interval remain on.

17. The method of claim 12, further comprising:

wherein after hard switching on the branch of the rectification stage that is to be conducting during the new power transfer interval, maintaining activation of the branch of the rectification stage that is hard switched on until current of the output filter inductor returns to zero or near zero.

18. The method of claim 12, wherein hard switching on the branch of the rectification stage that is to be conducting during the new power transfer interval comprises:

starting a timer at an end of a dead time for the switch devices of the branch of the power transfer stage that is to be conducting during the new power transfer interval; and hard switching on the branch of the rectification stage that is to be conducting during the new power transfer interval when the timer expires.

19. The method of claim 18, further comprising:

after hard switching on the branch of the rectification stage that is to be conducting during the new power transfer interval, maintaining activation of the branch of the rectification stage that is hard switched on so long as both switch devices of the branch of the power transfer stage that is conducting during the new power transfer interval remain on.

20. The method of claim 12, further comprising:

controlling the switch devices in a burst mode under lower power demand than in DCM, to transfer energy from the primary side to the secondary side during a power transfer interval in which one branch of the power transfer stage is conducting, one branch of the rectification stage is conducting and another branch of the rectification stage is blocking; and as the transformer voltage first begins to rise at the start of a new power transfer interval in the burst mode, hard switching on the branch of the rectification stage that is to be conducting during the new power transfer interval, so that the branch of the rectification stage that is hard switched on begins dissipating charge stored in the capacitance of the rectification stage when the transformer voltage first begins to rise.

* * * * *